US007634466B2

(12) United States Patent
Rose et al.

(10) Patent No.: US 7,634,466 B2
(45) Date of Patent: Dec. 15, 2009

(54) REALTIME INDEXING AND SEARCH IN LARGE, RAPIDLY CHANGING DOCUMENT COLLECTIONS

(75) Inventors: Daniel E. Rose, Cupertino, CA (US); Jianchang Mao, San Jose, CA (US); Chad Walters, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 249 days.

(21) Appl. No.: 11/498,706

(22) Filed: Aug. 2, 2006

(65) Prior Publication Data

US 2006/0294086 A1    Dec. 28, 2006

Related U.S. Application Data

(63) Continuation of application No. 11/478,291, filed on Jun. 28, 2006.

(60) Provisional application No. 60/695,239, filed on Jun. 28, 2005.

(51) Int. Cl.
*G06F 17/30* (2006.01)

(52) U.S. Cl. .............................. 707/3; 707/2

(58) Field of Classification Search ........................ None
See application file for complete search history.

(56) References Cited

U.S. PATENT DOCUMENTS

| 5,915,249 A * | 6/1999 | Spencer ........................ 707/5 |
| 6,816,850 B2 * | 11/2004 | Culliss ........................ 707/1 |
| 2002/0032772 A1 * | 3/2002 | Olstad et al. ................ 709/224 |
| 2003/0235188 A1 * | 12/2003 | Varma et al. ................ 370/379 |
| 2006/0200556 A1 * | 9/2006 | Brave et al. ................. 709/224 |
| 2006/0218114 A1 * | 9/2006 | Weare et al. ................... 707/1 |

* cited by examiner

*Primary Examiner*—Jean B. Fleurantin
*Assistant Examiner*—Thu-Nguyet Le
(74) *Attorney, Agent, or Firm*—Seth H. Ostrow; Ostrow Kaufman & Frankl LLP

(57) ABSTRACT

The present invention is directed to systems and methods for searching content items indexed in real-time. The method according to one embodiment comprises generating an index of word location pairs that identifies the location of one or more words in one or more content items available on a network. One or more additional content items are received over the network. The received content items are stored in a stream search queue, the stream search queue operative to allow for a stream search of the one or more additional content items.

12 Claims, 13 Drawing Sheets

My Trust Network 600

---

Friends 602

☺ User B (Bob Smith from cycling group)     [Edit] 606   [Delete] 608
    Trust = 3      17 friends
  605   Use B's friends    604

☺ User C (Smartest guy in the world)     [Edit]   [Delete]
    Trust = 5      5 friends
    Use C's friends 🚫 User D (John Q. Doe)     [Edit]   [Delete]
    Trust = 3      93 friends
    Don't Use D's friends ☺ User I (Mom)     [Edit]   [Delete]
    Trust = 2      23 friends
    Don't Use I's friends

[View Network] 609

---

Add a Friend 610

User ID: [____] 612    Trust: 1 (low) to 5 (high)= [____] 614    [Add] 620

Description: [_____] 616

☑ Use friend's friends
  618

---

Trust Network Settings 624

Select members by:      Use Trust Network for:
  ⦿ Degree of Separation      628 ☑ Highlight Search Results
  ○ Confidence Coefficient      630 ☑ Order Search Results
  ↑      632 ☑ Browser Toolbar
  626

Fig. 6

REALTIME INDEXING AND SEARCH IN LARGE, RAPIDLY CHANGING DOCUMENT COLLECTIONS

The present application is a Continuation Application of U.S. application Ser. No. 11/478,291, entitled "SEARCH ENGINE WITH AUGMENTED RELEVANCE RANKING BY COMMUNITY PARTICIPATION", filed on Jun. 28, 2006, the disclosure of which is hereby incorporated by reference in its entirety which claims priority to U.S. Provisional Patent Application No. 60/695,239, entitled "SEARCH ENGINE WITH AUGMENTED RELEVANCE RANKING BY COMMUNITY PARTICIPATION," filed on Jun. 28, 2005, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent content items or records, but otherwise reserves all copyright rights whatsoever.

FIELD OF THE INVENTION

The present invention relates to systems and methods for improving the reliability of search results. More specifically, the present invention relates to systems and methods for improving the reliability of searching and search results through the incorporation of the actions of users, as well as novel techniques for indexing the same, which may include the incorporation of the actions of a social network of users.

BACKGROUND OF THE INVENTION

Much of the information we use today is stored on computers or other devices such as PDAs that use computer technology. E-mail messages, word processing documents, and digital photographs are just of few common types of content items that are available to users. Because of the large sizes of these collections of content items, it can be difficult for users to find the information for which they are looking. A search engine is a software system used to facilitate the process of finding information in a collection of content items. Users express their information need in the form of a query (which typically comprises one or more query terms), and the search engine returns a list of content items that match the query in some manner.

Some search engines work by scanning each content item at the time that the user issues a given query, looking for the pattern of text described by the query. Many tools that search for files on a user's local machine use this type of search, often called a "direct file" or "stream" search. For example, the search utility in Microsoft Windows XP and the grep command that is part of the set of utilities provided with UNIX-based operating systems such as Linux both use direct file search. As the number of content items increases, however, directly searching through content items becomes too slow. Instead, many search engines actually search in a concise representation of the contents of one or more content items called an "inverted index," or simply an "index."

In order to create an inverted index, a given content item, such as an HTML document, is first broken into a list of words, a process known as tokenization. The complexity of the tokenization problem depends on the language in which the content item was written. For example, tokenizing Chinese text is more difficult than tokenizing English text, since word boundaries are not marked with spaces. After tokenization, words may be normalized to a standard form. For example, plural endings and other suffixes may be removed, a process known as "stemming" or "morphological analysis." Again, this process may be more complex for highly inflected languages. In addition, certain very common words known as "stop words" may be omitted. Finally, each occurrence of each word is recorded in the inverted index. The entire process of transforming the content item from its original form into a set of entries in an inverted index is known as "indexing."

The inverted index is a data structure consisting of a table of lists. Each entry in the table is accessed by a unique word, and each item in the list for a given word indicates a content item in which that word occurred. These items are called "postings," and the lists are called "posting lists." A posting contains an identifier for the content item containing the word, and may also include additional information about how often or where the word appeared in the content item.

When a user provides a query to a search engine that employs an inverted index, the system breaks the query into words in much the same way that the system processes content items. The system then looks in the table to find the posting list for each word. Each posting list represents the set of content items containing the word. If the user's query is interpreted as a Boolean AND, then the intersection of the sets for each word is computed. If it is interpreted as a Boolean OR, then the union of the sets is computed. In most search engines, a relevance score is computed for each candidate content item in the result set, and only the top-scoring candidates are retrieved. A variety of factors may determine the relevance score, including the frequency of occurrence of the query words, their statistical distinctiveness, and properties of the content item such as its modification date.

The Internet is a worldwide network of interconnected networks, which includes both public and private local and wide area networks of computers. One of the most commonly used Internet services is the World Wide Web ("WWW"), which consists of billions of content items, known as web pages, interconnected by hypertext links which allow users to navigate from a "source" page (the page containing the link) to a "target" page (the page pointed to by the link). Each page on the Web has a unique address known as a Uniform Resource Locator ("URL"). Hypertext links on the web contain two pieces of information: the URL of the target page, and a short piece of text, known as anchortext, that describes the target page.

Due to the large scale of the Web and the unique nature of the interlinked pages, web search engines typically employ more complex relevance ranking functions. In addition to the ranking features used in traditional search engines, web search engines also rely on information based on the connectivity of the page, such as the number of pages linking to it, in determining the relevance score of a search result.

Unfortunately, existing indexes used by search engines may not capture the precise verbiage that a user query comprises, raising issues of the relevance of content items in a result set. In addition to the foregoing, users are increasingly presented with disinformation when attempting to locate content items on the Internet. Due to the exploitation of shortcomings in existing search algorithms, users are confronted with issues of trust regarding content items that they locate on the Internet, including the content contained within such content items.

Therefore, new sources of information on which to base searches, as well as methods of using the same, are needed. Furthermore, new sources of information on which to base the ranking of content items in a result set are needed, as well as techniques of using the same, which may be used alone or in conjunction with existing searching and ranking techniques known in the art. Additional sources of information provide new ways to index and rank content items and the content contained therein, leading to more reliable search results for users. Furthermore, new techniques for indexing this information are needed.

SUMMARY OF THE INVENTION

The present invention provides systems and methods for improving searches over a corpus of content items, including improving the ranking of result sets produced by such searches to provide users with relevant results.

Embodiments of the present invention create one or more user profiles that comprise personalized information describing one or more interactions by a given user with one or more content items. According to one embodiment of the present invention, personalized information includes, but is not limited to, interactions such as saving, annotating, tagging and other user interaction with one or more content items.

Personalized information may be treated in a manner similar to other information comprising a content item for indexing, searching and ranking purposes. For example, personalized information such as annotations and tags may be treated similar to anchortext from a web page. Personalized information, like anchortext, includes descriptive text, but is created by individuals other than the author of a content item. Furthermore, personalized information provides descriptions, opinions and alternate forms of references (including spelling and word form variations) that might not be found in the original content item.

Personalized information from user profiles may be used to improve indexing, searching and ranking of content items. One exemplary mechanism would be as follows:

When a user saves a content item for the first time, the text of the content item (including any metadata) is added to a search engine's inverted index;

Any relevant personalized information from the user is also indexed, whereby personalized information is treated as separate fields of content from the content item; and When additional users save the content item at a later point, the content item is not re-indexed, but relevant personalized information from the additional users is added to the inverted index.

Accordingly, queries are executed over both the contents of the saved content item as well as the personalized information of users who have saved an interaction with the content item, thereby providing several benefits. First, search systems and methods of the present invention utilize personalized information in conducting indexing and searching activities and are capable of locating a relevant content item even though the content item does not contain the exact wording or spelling provided by a user's query. Second, the search systems and method of the present invention may harness the personalized information to improve the relevance scoring and ranking of content items, providing more relevant results to users. Personalized information may also be aggregated and indexed according to communities or social networks of users. Aggregating personalized information according to community membership enables community-aware searches.

Aggregate personalized information (which may be contained in one or more user profiles), or a subset thereof, may also be used to rank search results according to community-based features exposed by the personalized information of individual users. Community-based features may be combined with existing features of indexed content items in a variety of ways to improve ranking calculations. For example, ranking may be influenced by usage information from personalized information in user profiles, may be based on reputation or trust values for the information contained in individual user profiles or groups of user profiles, or by propagating reputation or trust values through social networks of related users.

According to the present invention, reputation or trust values may also be propagated through implicit and explicit social networks. An explicit social network is an explicit association between interconnected individuals, e.g., where a first user identifies an explicit relationship with one or more other users. Implicit relationships in social networks, however, may be defined between two users based upon personalized information in the two user's profiles. For example, where two users share the same opinion and have common interests, an assumption may be made that there is a degree of trust between the users regarding the content selected by each of the users. According to one embodiment, a feature vector is extracted from the personalized information in a user's profile. For a given pair of users, a similarity measure is computed between the feature vectors for the pair of users. The similarity measure may be interpreted as a trust or reputation value between the two users. According to another embodiment, a trust function may be learned from a set of training vectors, where the trustworthiness is known for a number pairs in the set. The trust function is a function of two feature vectors associated with two users. Once the trust function is learned, it may be applied to any pair of users. The implicitly derived trust may be combined with an explicit trust network to increase the density of trust in the social network, which may be propagated through the social network.

According to embodiments of the invention, content items and personalized information (content items that a user tags, annotates, saves, etc., as well as information regarding the same) may be made available for searching in real-time. An inverted index, which may be a word-location index, is generated for a corpus of content items. As users provide personalized information, the information is added to a stream search queue, which provides for direct access to the information. According to one embodiment, information from the stream search queue is indexed and written to the inverted index after a threshold is exceeded, which may be a time threshold, quantity threshold, etc. When a user conducts a search, the system may conduct a search over the information in both the inverted index and stream search queue to identify content items that are fall within the scope of the query that the user formulates.

Additional aspects of the present invention will be apparent in view of the description that follows.

BRIEF DESCRIPTION OF THE FIGURES

The invention is illustrated in the figures of the accompanying drawings which are meant to be exemplary and not limiting, in which like references are intended to refer to like or corresponding parts, and in which:

FIG. 6 is a screen diagram illustrating a graphical interface for building a social network according to one embodiment of the present invention;

DETAILED DESCRIPTION OF THE INVENTION

Figure 1:
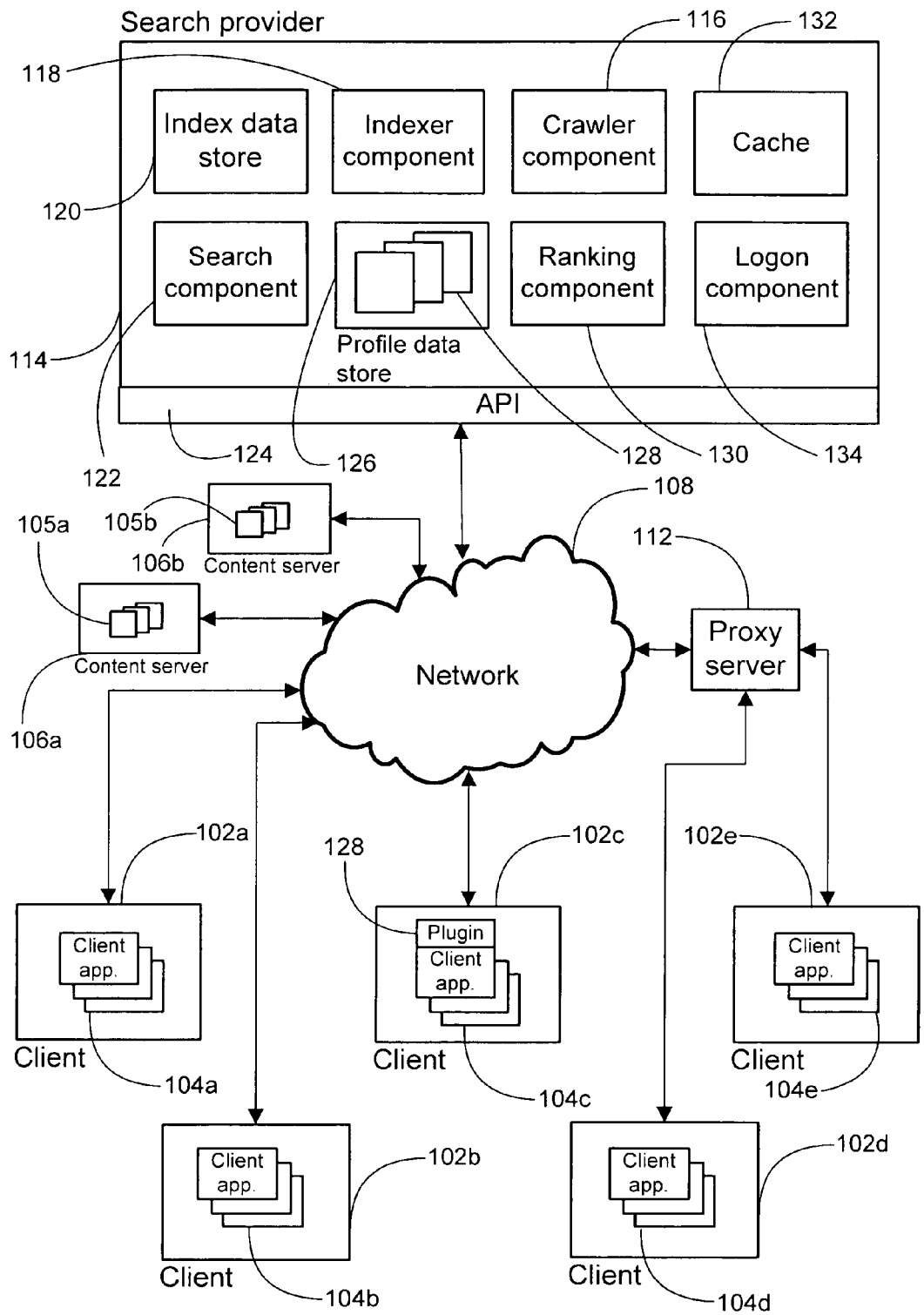
FIG. 1 is a block diagram illustrating a system for improving the reliability of search results according to one embodiment of the present invention.

The present invention generally relates to systems and methods for improving the reliability of items in a result set resulting from execution of a search over a corpus of content items, as well as the order in which the items are presented to a user. Embodiments of the invention may be generally implemented in software and hardware computer systems, using combinations of both server-side and client-side hardware and software components, to provide a system and method for improving the reliability of a result set returned by a search engine. The system may be embodied in a variety of different types of hardware and software as is readily understood by those of skill in the art. The system may, for example, provide an application program interface ("API") for use by developers to collect information to assist in the indexing of content items, as well as provide techniques for using the information for searching and ranking of result sets that are responsive to user queries.

A user interacts with a client workstation 102a, 102b, 102c, 102d and 102e. Client workstation may be a personal computer of the type that is well known to those of skill in the art and may include (not pictured) a processor, transient memory (e.g., RAM), persistent memory (e.g., hard drive), input device (e.g., mouse and keyboard) and circuitry to provide communication paths between the components. An exemplary personal computer is a Dell Dimension 3000 that comprises a 2.8 GHz Intel Pentium 4 Processor, the Microsoft Windows XP operating system, 256 MB of RAM and a 40 GB hard drive, keyboard, mouse, monitor, and Ethernet network interface. Other clients include, but are not limited to, PDAs, cellular devices, thin clients, etc.

A given client device 102a, 102b, 102c, 102d and 102e may comprise network interface hardware and software that provides the client with the ability to transmit and receive data over a network 108. The network 108 may be a local area network, a wide area network, or combinations thereof, e.g., the Internet, and provide communication channels between the clients 102a, 102b, 102c, 102d and 102e, content servers 106a and 106b, search provider servers 114, and other information sources.

A memory device on the client (not pictured), which may be a persistent or transient storage device, provides storage for one or more client applications 104a, 104b, 104c, 104d and 104e. One application the client runs is an operating system that provides both a high level user interface as well as low-level input/output control and memory management for the client 102a, 102b, 102c, 102d and 102e. As discussed above, Microsoft Windows XP is one exemplary operating system where the client is a personal computer. Other operating systems are contemplated by the invention as is appropriate for the client device that the user is employing, e.g., the Symbian 60 and Windows Mobile operating systems deployed on some portable cellular devices. Regardless of the operating system, the client maintains an application program 104a, 104b, 104c, 104d and 104e that provides and interface for browsing content made available by one or more content servers 106a and 106b.

The one or more content servers 106a and 106b host content items 105a and 105b accessible to clients 102a, 102b, 102c, 102d and 102e over the network 108. A content item may contain one or more pieces of content, e.g., text, graphics, audio, video, etc. As used herein, the term content item refers to any unit of content that is identifiable by a unique location or address (e.g., a URL). A client 102a, 102b, 102c, 102d and 102e uses a client application 104a, 104b, 104c, 104d and 104e, such as a web browser, to issue a request for a content item to a content server 106a and 106b by providing an address for the content item. The client application 104a, 104b, 104c, 104d and 104e receives the content item 105a and 105b that is responsive to the request and renders the content that is contained in or pointed to by the content item. For example, where a browser running on a client requests a web page from a web server, the browser receives the requested page and renders the content in the page, which may include links to download and render content items from other web sites.

Due to the vast number of content items located on the Internet, it is increasingly difficult to locate content items on interest. A search provider 114 provides a mechanism that allows clients to search for content items of interest. A search provider 114 according to the present invention comprises an crawler component 116, an indexer component 118, an index data store 120, a search component 122, a ranking component 130, a cache 132, a profile data store 126 to provide persistent storage for one or more user profiles 128, a logon component 134, and an API 124 that the components 116, 118, 122, 130, 132 and 134 may use to execute functions for storage, retrieval and manipulation of data in the index data store 120 and profile data store 126. It should be noted that the search provider 114 and its constituent components and data stores may be deployed across the network 108 in a distributed manner whereby key components are duplicated and strategically placed throughout the network 108 for increased performance, e.g., close to the edges of the network.

The search provider 114 comprises a crawler component 116 that is operative to open a communications channel with a content server 106a and 106b over the network 108. The crawler 116 retrieves a content item 105a and 105b from the content server 106a and 106b and may store a copy of the content item in a cache 132 at the search provider 114. The cache 132 is a data structure that a persistent storage device maintains for the storage of content items, as is known to those of skill in the art. The crawler component 116 may also follow links to other content items that a given content item 105a and 105b references, navigating to the referenced content item and saving a copy of the content item in the cache 132, and so forth. Preferably, the crawler component 116 retrieves content items from a plurality of content servers 106a and 106b in a substantially simultaneous manner so as to collect content items 105a and 105b from the greatest number of content servers 106a and 106b in the least amount of time. An exemplary system for crawling content items is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

In addition to using the crawler component 116 to collect content items 105a and 105b from over the network 108, the search provider 114 may also collect information on individual users by monitoring user interaction with client applications 104a, 104b, 104c, 104d and 104e, content servers 106a and 106b, the search provider 114 and other information sources made available over the network 108. The search provider 114 may collect information according to a number of techniques. According to one embodiment, a client application 104c interfaces with a plug-in component 128, e.g., a browser toolbar component, that monitors information in the stream of data traffic transmitted and received by the client application 104c. The plug-in 128 may aggregate this information locally on a transient or persistent storage device, which the plug-in 128 periodically transmits to the search provider 114 over the network 108. One embodiment of such a plug-in is the Yahoo! Toolbar browser plug-in for Microsoft's Internet Explorer browser. The user may also utilize the plug-in to indicate specific preference or content items that the user wishes to manually transmit to the search provider 114, e.g., when manually saving a content item, such as a web page.

Alternatively, or in conjunction with a plug-in 128, a client application 104d and 104e may be in communication with a proxy server 112. Data traffic from the client 102d and 102e passes through the proxy server 112 prior to receipt by the component to which the data is addressed, e.g., content server 106a and 106b. The proxy server 112 may record information from the stream of data traffic transmitted and received by the client application 104d and 104e. The proxy server 112 may further aggregate this information from a plurality of connected clients 102d and 102e and periodically transmit the information to the search provider 114. Where the client application 104a and 104b employs neither a plug-in 128 nor transmits and receives information through a proxy server 112, the search provider 114 may directly collect information from the stream of data that the client application transmits and receives. For example, where the search provider maintains a suitably large collection of content items in the cache 132, the user may browse though content items from the cache 132 as opposed to browsing the content item from its source location 106a and 106b, allowing the search provider 114 to observe information in the data stream. Similarly, the search provider 114 may provide the user with one or more controls that allow for saving content items to the cache 132.

In addition to collecting information from the stream of data that the client application 104a, 104b, 104c, 104d and 104e transmits and receives, the search provider 114 may provide advanced functionality that allows a user to perform one or more actions upon content items 105a and 105b that the user browses. The search provider 114 comprises an API 124 that exposes functions for allowing the user to personalize content items and the content contained within content items, such as saving, tagging, annotating, etc., as well as maintain a user's navigation history, which is referred to herein as personalization. Personalization actions that the API 124 provides include, but are not limited to, saving copies of content items, tagging content items, annotating content items, and performing other actions, e.g., highlighting content in a content item. The search provider 114 comprises a login component 134 that provides authentication of a user's credentials, thereby providing access to personalized information for the user, e.g., a profile, which may include a portion of dedicated persistent storage space. Credentials that the user provides to the login component 134 may comprise a username/password pair, a physical token, a biometric identifier, or other identification credentials known to those of skill in the art. According to one embodiment of the invention, the browser plug-in 128 provides client side communication to the API 124. When the user wishes to log into the search provider 114, the plug-in 128 provides a login interface and makes the appropriate calls to the API 124 to authenticate the user on the basis of one or more credentials that the user provides.

When the search provider 114 authenticates the user's credentials, the search provider 114 provides the user with access to the functions that the API 124 offers. As the user uses the client application 104a, 104b, 104c, 104d and 104e to browse content items 105a and 105b that the content servers 106a and 106b host, function calls may be made to the API 124 at the search provider 114 to generate and store personalized information. According to one embodiment of the invention, the API 124 provides a function call that allows a user to save an annotation and associate the annotation with a content item available at a given address, a given annotation, for example, providing the user's thoughts or comments regarding the content item or the content contained therein. Similarly, the API 124 may provide a function call that allows a user to save one or more tags and associate the one or more tags with a content item available at a given address, a given tag, for example, indicating a user provided keyword for describing the content item or the content contained therein. Another function that the API 124 may provide allows a user to save a copy of the content item or one or more pieces of content contained therein. Systems and methods for generating personalized information are described in commonly owned patent application Ser. No. 11/081,860, entitled "SEARCH SYSTEM AND METHODS WITH INTEGRATION OF USER ANNOTATIONS," filed Mar. 15, 2005, the disclosure of which is hereby incorporated by reference in its entirety.

By way of example, assume that the user's client application 104c is Microsoft's Internet Explorer browser configured with the Yahoo! Toolbar plug-in 128 that the user employs to log into the search provider 114 at my.yahoo.com, which offers personalized content to the user in addition to search and other functionality. Subsequent to logging in, the user employs the web browser 104c to navigate to a given page 105a at a web site 106a, the page identified or addressed by a URL. Because the user has logged into the service provider 114, the service provider 114 may use a navigation history of the user to build an indicia of the user's browsing habits for storage in his or her profile 128 in the profile data store 126. When at the web page 105a, the user may access one or more personalization functions that the API at the service provider 114 exposes, e.g., generating an annotation or tag regarding the page that may be viewed at a later date, which may be stored in a user's profile 128 at the profile data store 126. As is explained in greater detail herein, personalized information, which a user profile 128 may maintain, may be used by the search provider 114 to improve the reliability of the search results that it produces Regardless of the specific manner in which the search provider 114 receives information regarding the use of the client application 104a, 104b, 104c, 104d and 104e, the search provider 114 creates a profile 128 for each user of a client application 104a, 104b, 104c, 104d and 104e with which the search provider 114 is in communication, e.g., through a plug-in 128 or proxy server 112, for the storage of personalized information. The search provider 114 generates one or more user profiles 128 that organize and provide a given user with access to his or her personalized information, as well as allow the search provider 114 to leverage the personalized information in indexing, searching and ranking search results, thereby enhancing the relevance of items comprising a given search result.

A number of mechanisms are described herein for collecting personalized information regarding the user including, but not limited to, navigation history, saved content items, tags, annotations, and other information. According to one embodiment, the search provider 114 stores personalized information on a per-user basis as one or more profiles 128 in a profile data store 126. The profile data store 126 may comprise a relational database whereby each user profile 128 is structured as one or more records located in one or more related data tables. Other data stores are also contemplated as falling within the scope of the invention including, but not limited to, comma separated value data stores, tab delimited value data stores, object-oriented databases, hybrid relational-object databases, etc. The user profiles 128 provide the search provider 114 with a mechanism to retrieve personalized information for one or more given users, such as annotations, tags, saved pages, navigation history, etc. For example, when the user navigates to a page on which he or she has previously recorded an annotation, the search provider 114 may display the user's annotation on a display device in conjunction with the page to which the user navigated. Similarly, when presenting a search result to a user, the search provider 114 may display an indication that a user has saved, tagged, annotated, etc. a given content item in the search result.

In addition to the foregoing personalized information that the search provider 114 may capture regarding a given user for storage in one or more user profiles 128, the search provider 114 allows the users to create social networks of inter-related users. According to one embodiment, a social network may be viewed as a graph wherein each node in the graph represents a user and each edge represents a relationship between two users, such as a friend, colleague or family member. The degree of separation between a pair of nodes is the minimum number of hops from one node to another. For example, a degree zero node is a given node itself, degree one nodes are those nodes that are directly connected to a given node, degree two nodes are those nodes that have one node between themselves and the given node, etc.

Figure 2:
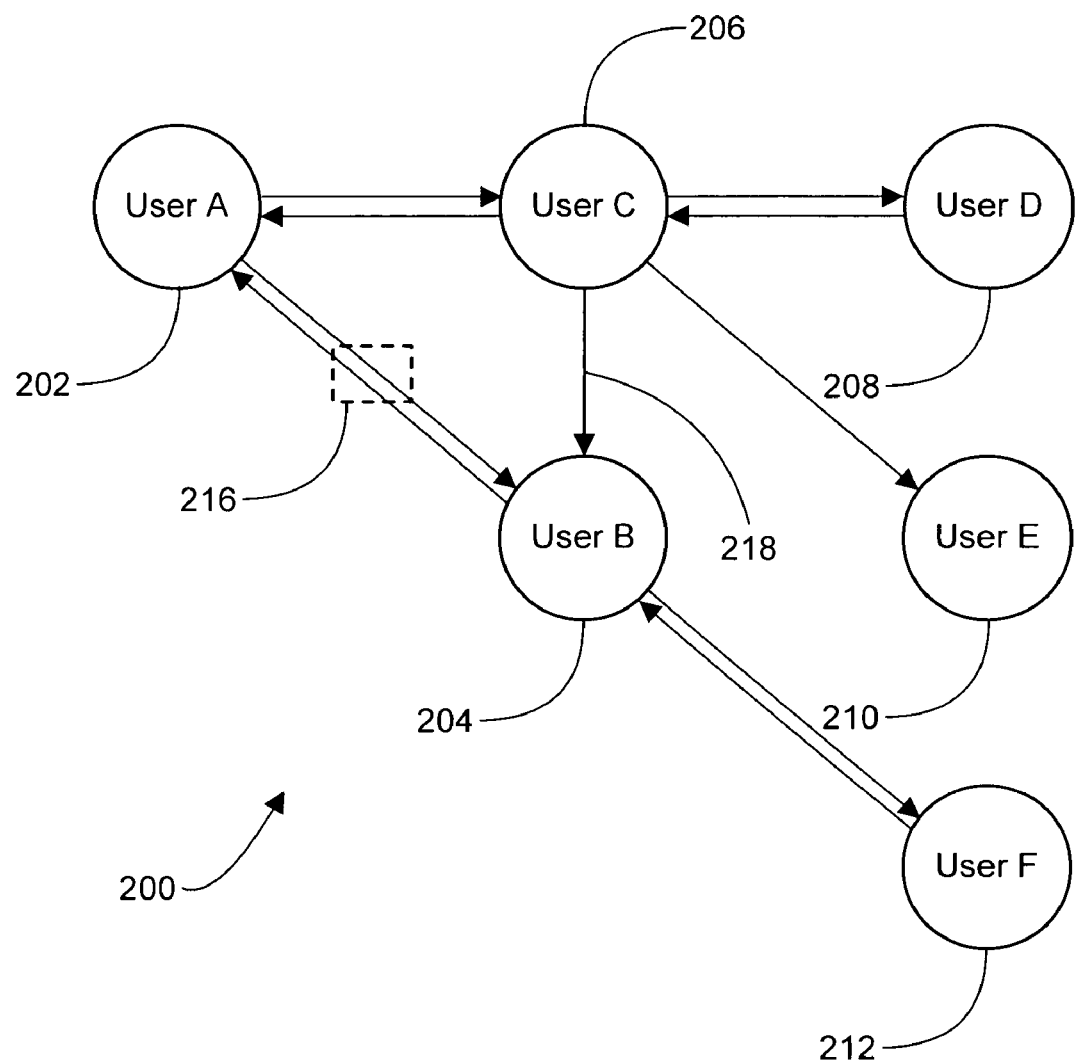
FIG. 2 is a block diagram illustrating a relationship between individuals in a social network according to one embodiment of the present invention.

FIG. 2 is a block diagram illustrating relationship between individuals in a social network according to one embodiment of the present invention. According to the social network of FIG. 2, the graph 200 illustrates the inter-relationships between several nodes 202, 204, 206, 208, 210 and 212. A given node represents a user registered with the search provider and the edges between nodes represent the relationships between given users. More specifically, according to the embodiment of FIG. 2, each edge represents the "direction" of a relationship between two users. Maintaining information regarding the direction of a given relationship allows the search provider to account for relationships where both users identify or acknowledge the relationship, as well as relationships where only one of the users identifies or acknowledges the relationship. For example, the edges 216 connecting User A 202 and User B 204 is a bi-directional edge indicating that User A 202 acknowledges a relationship with User B 204 and vice versa. By contrast, the edge 218 connecting User C 206 and User B 204 is a unidirectional relationship indicating that User C 206 identifies a relationship with User B 204, but that User B 204 does not identify a relationship with User C 206. A given edge may further represent a strength of a relationship between two nodes in the social network 200, e.g., by representing the strength of a given relationship in accordance with a thickness of a given edge.

Returning to FIG. 1, the search provider is operative to store relationship or social network information in a profile 128 for a given user. As is described in greater detail herein, the search provider 114 provides a user interface, which may be a graphical user interface, that allows a given user to identify other individuals with which the user has a relationship. For example, a profile for User A may identify that User A has a certain kind of relationship with User B, User C and User D. According to one embodiment, a given profile 128 comprises information regarding other individuals with whom a given user has a relationship. On the basis of relationship information contained in the user profiles 128 for users of the search provider 114, which may comprise all users or one or more subsets thereof, the search provider 114 may calculate a graph that identifies a social network for a given user. Continuing with the previous example, the search provider may examine User A's profile to determine the relationships of User A. The search provider may then examine the profiles for users with which User A maintains a relationship. By repeating this process to a logical or pre-determined cutoff point or threshold, the search provider 114 may calculate a graph comprising social network information that represents the social network for User A. As is described in greater detail herein, the search provider 114 may use the social network information to provide increased reliability of the search results that the search provider 114 generates for a given user. According to one embodiment, the social network information may comprise one or more items of personalized information from one or more users in the social network.

The search provider 114 comprises an indexer component 118 that indexes the content items that the crawler component 116 collects, as well as personalized information in the user profiles 128. The indexer component 118 may parse a given content item into indexable words. The indexer component 118 may also assigns location information to the words as they are parsed. The location information indicates the location of the unique occurrences of the word on the Internet, e.g., the content items that contain the word. According to one embodiment, the output of the indexer component 118, which may be written to an index data store 120 on a transient or persistent storage device, is an inverted index that includes one or more index entries for each unique word that it encounters. A given inverted index may also include one or more location entries indicating the addresses of content items that contain the word. An exemplary system for indexing content items on the Internet is described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which his hereby incorporated by reference in its entirety.

According to embodiments of the present invention, the indexer component 118 also parses and indexes personalized information that is stored in the user profiles 128 that the search provider 114 maintains in the profile data store 126. The indexer component 118 may treat the annotations and tags as separate fields of content from a given content item with which a given annotation or tag is associated. As users continue to annotate and tag content items, the indexer component 118 traverses the user profiles 128 and parses the annotations and tags to add to the inverted index. As is explained in greater detail herein, the indexer component 118 may also index information in real time as the corpus of content items, including user annotations, tags, comments, and other personalized information, as the corpus grows. The index data store 120 contains a resultant inverted index identifying the unique words contained in the content items that the crawler component 116 identifies and the locations of those words, as well as annotations, tags and other personalized information associated with the content items.

When the indexing component 118 indexes personalized information in conjunction with the words in a given content item, the search component 122 may be operative to search both the contents of content items in addition to personalized information. Indexing personalized information provides several benefits beyond indexing only the words in a given content item. First, the search component 122 is operative to locate content items that match the informational needs of a given user even though the content item may not contain the exact wording or spelling of terms identified in a query that the given user provides. Second, the search component 122 is operative to harness information regarding the personalized information to improve the relevance scoring and ranking of result sets that the search component 122 generates, which in turn provides the user with more accurate search results, e.g., the identification of the most relevant content items. A third benefit is a function of the fact that the authors of content items are not necessarily taken from the same group of individuals that are searching for content items. Users providing personalized information, however, provide information regarding the quality of a given content item, in addition to other descriptive information, which improves the effectiveness of searching beyond using only the content comprising a content item. It should be noted that in addition to indexing user annotations and tags, the indexer component 118 may utilize other information in the user profiles 128 in the profile data store 126 when generating the resultant inverted index.

The indexer component 118 outputs the resultant one or more inverted indexes for storage in the index data store 120, which the search component 122 uses to locate content items that are responsive to a query from a given user. By using personalization information that the indexer component 118 indexes, e.g., from user profiles 128, the search component 122 may locate content items in the inverted index that are relevant to a query beyond those content items located based solely on the words contained within the content items. The content items that the search component 122 locates that are responsive to a given query, however, do not draw the attention of a user to the most relevant content items. According to one embodiment, the search component 122 provides the result set to a ranking component 130, which ranks the result set such that the most relevant content items in the result set are presented to the user first, preferably according to descending relevance, e.g., the first content item in the result set is the most relevant to the query and the last content item in the result set is the least relevant to, yet still falling within the scope of, the query.

The ranking component 130 may utilize personalized information contained in one or more user profiles 128 to rank a result set that the search component 122 generates. Ranking the result sets according to information contained in the user profiles 128 is referred to as community-based ranking, as according to one embodiment it is based on the behavior of the user community as reflected in the aggregate user profiles 128 in the profile data store 126. The personalized information contained in the aggregate user profiles 128 (which may be referred to as community based features) may be combined with existing features, e.g., the inverted index of words and their respective locations, to augment a ranking calculation that the ranking component 130 performs. For example, a linear function may combine community based features with other features, community based features may be used to re-rank the output of existing ranking techniques (used as multiplicative weights, magnifying or reducing previously computed ranks), or community based features may be added to the pool of information available for ranking and chosen by a machine learning technique, such as a neural network. Techniques for machine learning a function to determine content item relevance is described in commonly owned U.S. patent application Ser. No. 10/424,170, entitled "SYSTEM AND METHOD FOR MACHINE LEARNING A DOCUMENT RELEVANCE FUNCTION," filed on Apr. 25, 2003, the disclosure of which is hereby incorporated by reference in its entirety.

It should be appreciated by those of skill in the art that the community based features contained within the user profiles may be used in a number of specific ways to influence the ranking of content items contained in a result set. One technique involves ranking according to usage of content items by users such that the more users save a given content item, the more likely that the given content item is an important content item. Therefore, one simple community based feature is the raw number of users who save, annotate or tag a given content item. The ranking component 130 may calculate this information by reviewing the personalized information contained within one or more user profiles 128. Another technique involves calculating how recently a user has saved, tagged or annotated a given content item such that the ranking component 130 assigns a higher rank to recently annotated, tagged or saved content items. Alternatively, the ranking component 130 may replace raw content item usage information with the proportion of users who have saved, annotated or ranked a given content item. Similarly, the ranking component 130 may calculate a ratio between the content item usage as described above with a connectivity for the content item, e.g., the number of other content items that contain links to a given content item.

Another community based feature that the ranking component 130 may use to calculate the rank of a content item involves reputation or trust of the users that are providing annotations and tags, or are saving a given content item. The ranking component 130 may factor in or otherwise account for a reputation score when calculating the rank of a content item such that content items that are saved, annotated or tagged by high-reputation users are assigned a higher rank that those with lower reputations. One exemplary measure is a reputation-weighted average in which instead of starting with a raw count of the number of users who have saved, annotated or tagged a content item, the ranking component 130 starts with the sum of the reputation scores of each of the users that are saving, annotating or tagging a given content item.

Another ranking technique that the ranking component 130 may employ in ranking content items is a dual TrustRank value. The dual TrustRank technique takes advantage of two types of social structures that the search provider 114 maintains: the link structure between content items and the social network that interconnects users as identified by relationship information contained in the user profiles 128 in the profile data store 126. The links between the two structures are the content items that the users view (e.g., navigation and search history), save (e.g., bookmark or save to the search provider), rate, share, etc.

The dual TrustRank value consists of a TrustRank value for users and a TrustRank value for content items, or the domains that host the content items. A TrustRank is assigned to a given user, which may be calculated on the basis of trust ratings for the given user provided by other users. This information may be stored in a profile for the given user, e.g., the profile identifies users for which the given user has provided a ranking, which may also include the rank provided, or alternatively, the search provider may calculate a trust rating for a given user on the basis of trust ratings provided by other users, which is written to the profile for the given user. Where user ratings are not available, there are other techniques for calculating a trust rating for a given user. For example, human experts may rate users on the basis of the content items that they are savings, or a trust rating may be calculated for a given user on the basis of how the pages the given user is saving are being used by other members with which the given user maintains relationships.

A TrustRank value may be calculated for content items based on save (annotation, tag, etc.) rates of users. Assume that a set of users have saved (annotated, tagged, etc.) a number of content items. The union of saved content items by the users may serve as seed content items for calculating the TrustRank of content items. According to one embodiment, the TrustRank score for the seed content items may be derived as follows: if a content item f is save by a number of users $\{u_i, r_i | i=1, 2, \ldots, n\}$, where user $u_i$ assigns a rating $r_i$ to content item f where ratings are not supported, assume $r_i=1$ for each saved page. On the basis of this assumption, TrustRank for a content item may be calculated according to the equation of Table 1:

TABLE 1

$$\text{TrustRank}(f) = \sum_i r_i * \text{TrustRank}(u_i) \bigg/ \sum_i r_i$$

The TrustRank score of the seed content items derived according to the calculation of Table 1 may be propagated through the web of links connecting content items according to propagation techniques known to those of skill in the art. Furthermore, where human experts identify and rank additional seed content items, these content items may be incorporated into the calculation of Table 1.

In addition to ranking content items based on the personalized information contained in profiles 128 in the profile data store 126, one embodiment of the invention comprises the ranking component making use of social network information to rank a result set in accordance with the behavior of a community of users. The ranking component 130 starts with a given user whose search results require ranking. The ranking component 130 retrieves the given user's profile 128 from the profile data store 126 and identifies the users to which the given user is related. The ranking component repeats this process for the users that are related to the given user. The process is repeated until the ranking component 130 reaches a logical or pre-determined cutoff point, e.g., users that are within four degrees of separation from the user. The ranking component 130 calculates a social network for the given user from the profile information 128 in the profile data store 126 and may rank the result set that the search component supplies on the basis of the personalized information in these profiles according to the techniques discussed above.

One embodiment of a ranking algorithm makes use of the social network for a given user providing a query. Assume a user x issues a query y and that the search component returns a result set UE(q). Further assume that x specifies a filter F and that the rated results UR(F) correspond to other users y that satisfy the filter F. An exemplary result set might be u∈UE(q)∩UR(F). To rank the URL u according to the viewpoint shared by the users in the social network that x maintains, the ranking component 130 may apply the transformation of Table 2 to calculate a rank for u:

TABLE 2

$$S(u) = SE(q, u) + \sum_{y | u \in UR(y)} q\text{sim}(q, q(y, u)) \cdot R(x, y) \cdot s(y, u)$$

Now assume that U∈UE(q)\UR(F) and the value f is a measure of a content item's freshness, which may be based on a timestamp indicating when the content item was last tagged, annotated, saved, etc., e.g., the date or time at which a user provides a given item of personalized information. The freshness value f allows the ranking component 130 to promote or demote the rank of a given content item according to the function g(f). The ranking component 130 may apply the transformation of Table 3 to calculate a final rank for the URL u:

TABLE 3

$$S'(u) = SE(q, u) + \sum_{v \in UR(F), y \in F} u\text{sim}(u, v) \cdot R(x, y) \cdot s(y, v) + g(f)$$

In the formulas of Tables 2 and 3, the variable y represents the range over those users that rated u, and q(y,u) and s(y,u) correspond to a rating (y, q, u, s). The rating is a function of results that user y rated over his or her lifetime, whereby the ratings consist of different URLs u returned for different queries q and of y's ratings s. The trust network comprising the designated users y that are related to user x is taken into account by the formula. A trust coefficient T(x,y) may be assigned to one or more users related to x, and a propagation algorithm (which is described in greater detail below) may assign an importance factor R(x,y) that is a measure of the impact of a distant y from x. According to one embodiment, R(x,y) may be calculated according to an asset allocation model similar to.

The ranking functions of Table 2 and 3 employ similarity functions for queries and URLs. Similarity measures of two queries qsim(q1, q2) may be calculated "directly" (using query strings with potential linguistic processing enhancements) or indirectly, whereby the ranking component 130 considers several top content items that the search component 122 retrieves for a set of queries and determines how these content items may be categorized into a given hierarchy (e.g., ODP). This allows the association of a vector with each query (one component per hierarchy node), whereby similarity may be calculated in terms of these vectors. Indeed, the ranking component 130 may use any query categorization technique that generates a vector of query attributes, whereby similarity may be calculated in terms of the vectors, or combinations of the techniques described above. A similarity measure is also defined for two URLs usim($u_1$, $u_2$). For example, the similarity may be calculated according to whether two URLs are located in the same domain. Alternatively, the ranking component 130 may employ indirect classification of a content item into an arbitrary category and compare two hierarchical probabilities of category outcomes. Still further, the ranking component may employ information retrieval ("IR") textual similarity techniques known to those of skill in the art.

Figure 3:
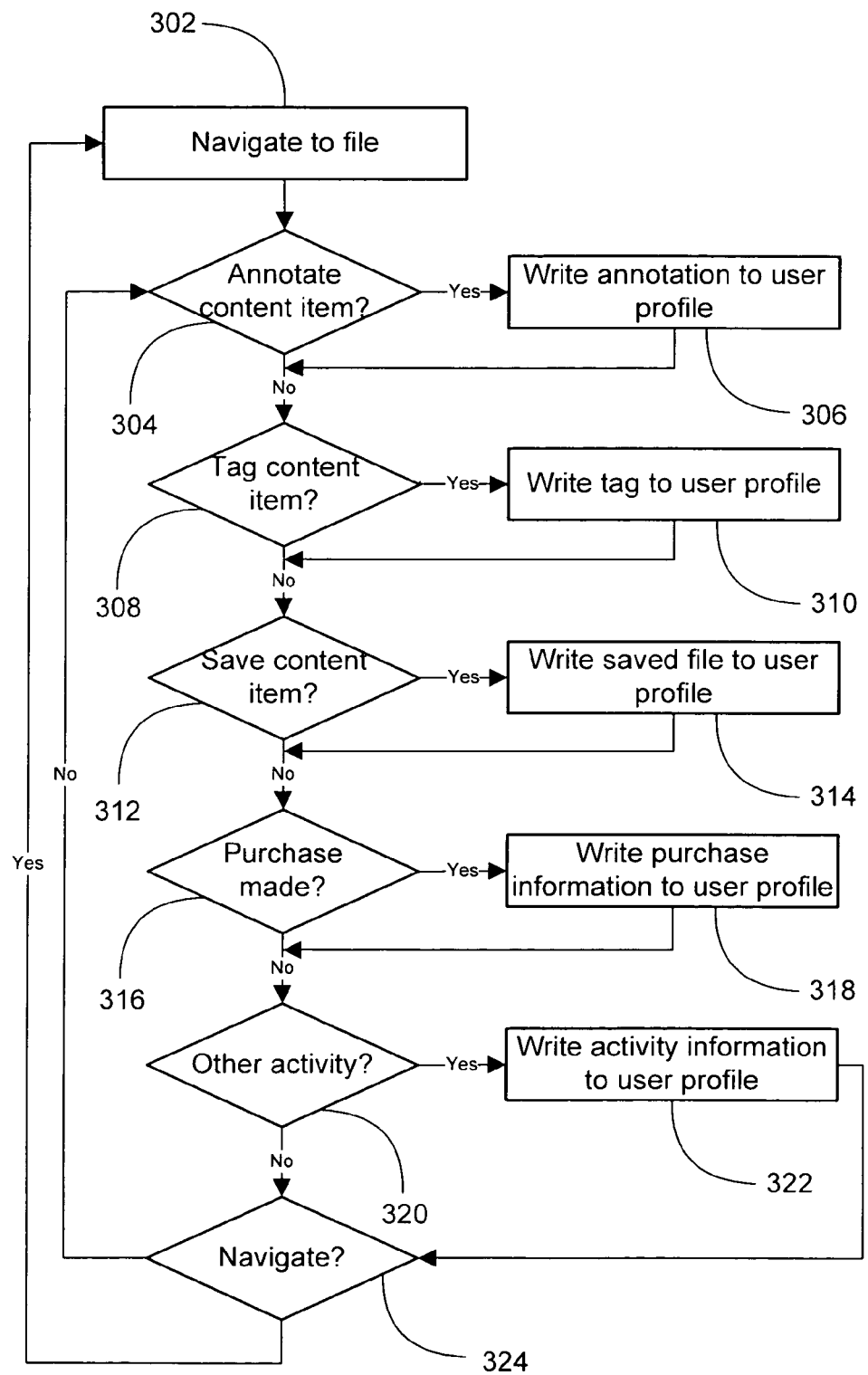
FIG. 3 is a flow diagram illustrating a method of collecting user activity according to one embodiment of the present invention.

One embodiment of a method for using the system described in FIG. 1 to collect personalized information, which may be a user profile may maintain, is illustrated in FIG. 3. As described above, there are a number of techniques that may be used to implement the method of collecting personalized information for storage in a user profile including, but not limited to, using a plug-in with a client application, modifying a client application to collect and transmit personalized information to a search provider for aggregation into one or more user profiles, and browsing content items through the use of a proxy server, whereby the proxy server collects personalized information for one or more user basis and sends the information to the search provider, which may comprise sending on a per-user basis, for aggregation into one or more user profiles for users that the proxy server is tracking. Other techniques for implementing the method of FIG. 3 should be apparent to those of skill in the art as falling within the scope of the invention.

According to the method of FIG. 3, a user navigates to a content item using a client application, step 302, e.g., navigates to a web page using a web browser. The system performs a number of checks to determine the interaction of the user with the content item for recordation, which may comprise recordation in one or more profiles associated with the user. The system performs a check to determine if the user creates one or more annotations for the content item, step 304. Where the user creates one or more annotations for the content item, step 304, the system may write the annotation to the profile for storage, step 306. Processing continues with the system performing a check to determine if the user creates a tag for the content item, step 308, wherein each tag is a descriptor for the content item that the user provides. Where the user creates one or more tags for the content item, step 308, the system writes the tags to the profile for storage, step 310.

Processing continues with the system performing a check to determine if the user saves a copy of the content item, step 312, adding the content item to the user's corpus of saved content item. Where the user saves the content item to his or her corpus of saved content items, step 312, the system may write the content item to the profile for storage, step 314. Alternatively, the system may write indicia of the content item to the user's profile, e.g., the system may write the URL for the content item to the user's profile to indicate that the user has bookmarked the content item. Similarly, where the system maintains a copy of the content item in its cache, the system may write the address for the content item in the system cache to the profile for later retrieval of the content item from the cache. The system may also perform a check to determine if the user is conducting a purchase of goods or services through interaction with the content item, step 316. Where the user conducts a purchase, the system may collect purchase details for recordation in the user's profile, step 318.

The system may also collect information regarding other activities by the user that indicate an interaction with the content item, step 320. Other interaction is a "catch all" whereby the system writes any activities not captured by previous checks to the profile, step 322. Other activity may be navigation away from the content item or any interaction with content or controls contained within the content item. For example, where the content item is an interface that allows the user to define or select other individuals with whom the user maintains a relationship, the system may write this social network information to the profile, whereby a social network of users may be created by the social network information contained in a plurality of user profiles.

After user interaction with the content item, if any, is collected, steps 306, 310, 314, 318, 322, the system performs a check to determine if the user navigates away from the current content item to which the user navigated, step 324. Where the user does not navigate away from the current content item, processing returns to step 304 and the system continues to trap for and record the user's interaction with the content item. Where the user does navigate away from the current content item, step 324, processing returns to step 302 with the user navigating to a subsequent content item and the system continuing to trap for and record the interaction with the subsequent content item.

Figure 4:
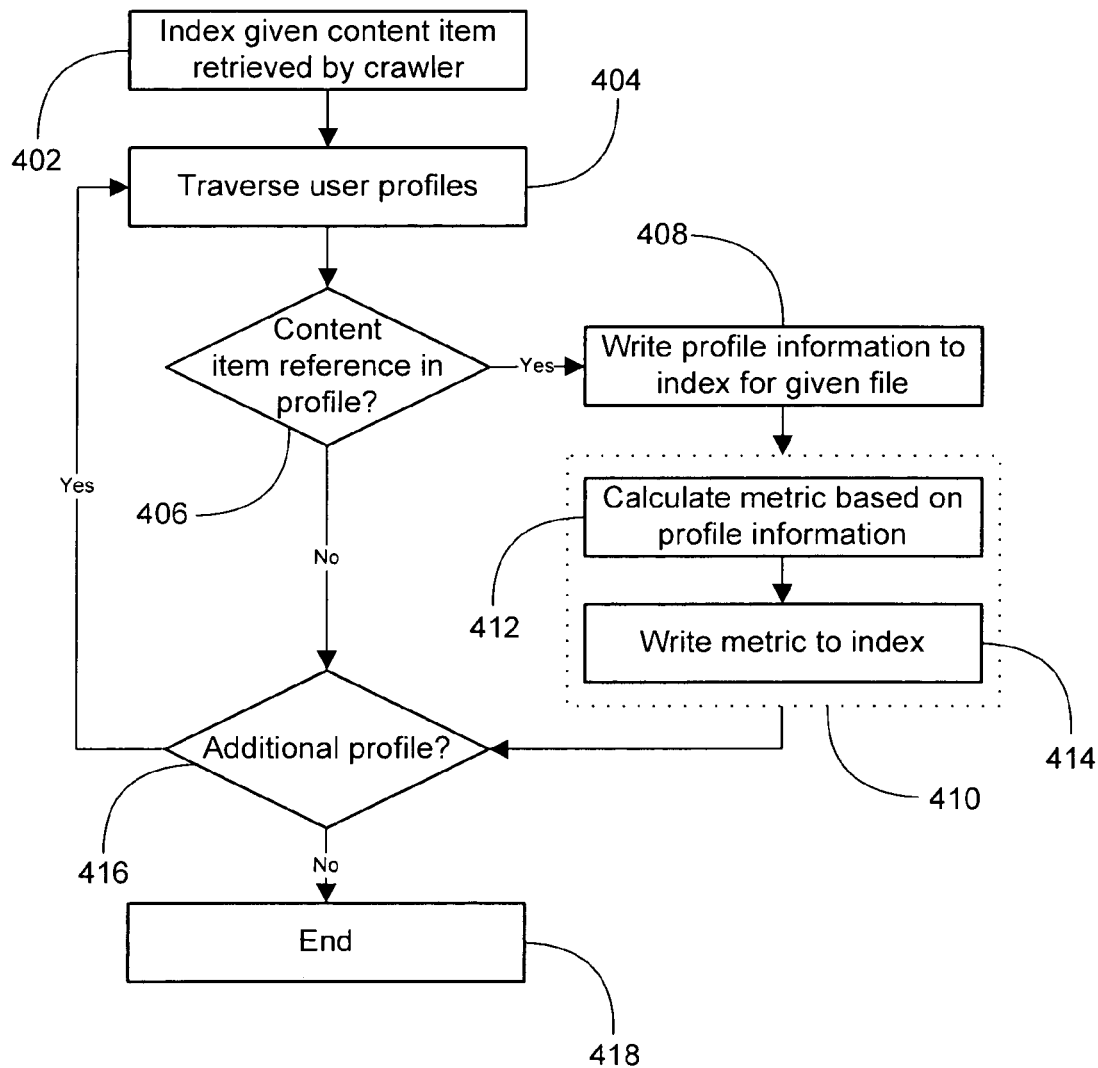
FIG. 4 is a flow diagram illustrating a method of indexing information from user profiles according to one embodiment of the present invention.

FIG. 4 illustrates one embodiment of a method of indexing the information in the user profiles generated through the process of FIG. 3. According to the method of FIG. 4, the indexing component selects a given content item that the crawler has collected for indexing, step 402. Using techniques described herein as well as known to those of skill in the art, the indexing component indexes the content item. For example, the indexing component may parse the unique words contained in a given content item and write those words, along with the location of those words, to create an inverted index. The indexing component indexes the given content item and traverses one or more user profiles, step 404. For a given user profile, a check is performed to determine whether the profile comprises a reference to the content item, step 406. For example, where the user creates an annotation or tag for the given content item, or saves a reference to or copy of the given content item, the check at step 406 evaluates to true.

Where the profile comprises a reference to the given content item, step 406, the profile information may be added to the inverted index, step 408. For example, where the user profile indicates that the user has created an annotation for the given content item, the words comprising the annotation are parsed and added to the inverted index such that the user's annotations are indexed as if they are part of the words comprising the content item. Accordingly, the index entry for the content item contains words that describe the content item beyond the words that comprise the content item. This allows a search component to select the content item for inclusion in a result set event though the content item may not contain the exact words (or spelling) in a user's query, thereby providing improved relevance when generating a result set.

According to embodiments of the invention, a sub-process may be performed to calculate metrics that are used in searching and ranking files, block 410. The method calculates a content item metric on the basis of personalized information in one or more profiles for one or more users, step 412, which may be written to the inverted index for the given content item, step 414. Calculation of content item metrics advantageously provides for faster searching and ranking of content items, as values used in these calculations are complete or partially calculated. For example, where a user saves, annotates or tags a page (e.g., creates personalized information) the method may increment a usage value for the given content item, step 412, which is written to the inverted index, step 414. A search component or ranking component may employ this usage metric when searching for a content item or ranking a content item. Techniques for real-time indexing a described in further detail herein.

Personalized information, or portions thereof, that references the given content item is written to the inverted index, steps 408 and 414, and a check is performed to determine if there are additional profiles for processing, step 416. Where additional profiles are present, processing returns to step 406, where the system retries a subsequent user profile and performs a check to determine if there is a reference to the content item in the profile. Accordingly, the system examines the user profiles to determine if there is a reference in the profiles to the given content item, and indexes the information from the user profile when present. Where there are no additional profiles, step 416, the indexing of the content item and references to the content item from the user profile is complete and indexing of the given content item is complete, step 418. The process of FIG. 4 may be repeated to index other content items and references in one or more user profiles to the other content items.

Figure 5:
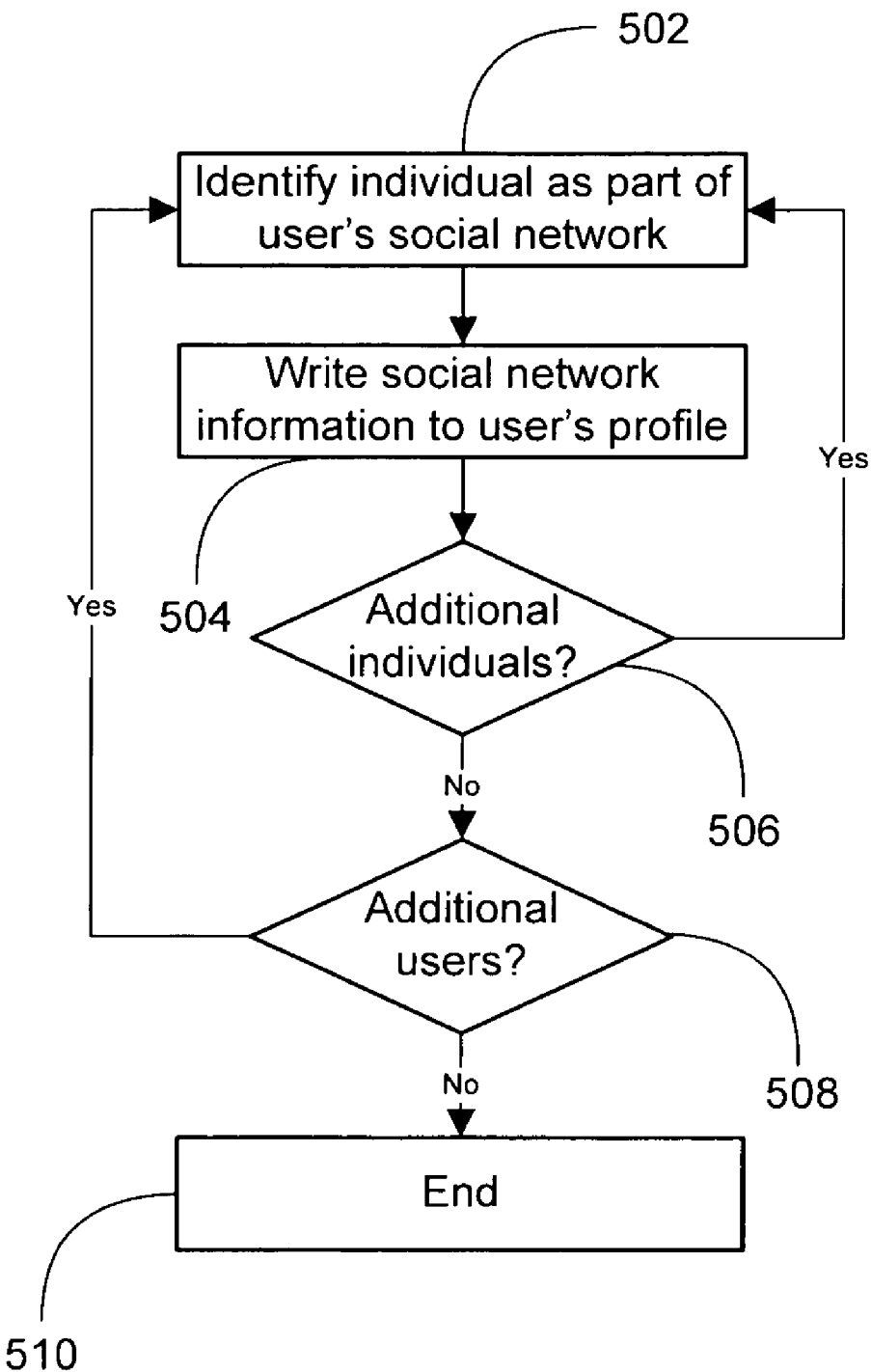
FIG. 5 is a flow diagram illustrating a method for maintaining a social network of individuals according to one embodiment of the present invention.

As discussed above, a user may identify other individuals with whom the user maintains a relationship, also referred to as the user's social network. FIG. 5 presents one embodiment of a method that the user may employ to define his or her social network. Using an interface, which may be a graphical user interface, a command line interface or other interface known to those of skill in the art, a user identifies an individual as a member of the user's social network, step 502. The step of identifying an individual as part of the user's social network may also include the user providing identifying and social network information regarding the individual, for example, a unique identifier and a trust coefficient for the individual that is an indication of the level of trust a user has for the individual.

The social network information for the individual is written to a profile for the user, step 504, and a check is performed to determine if there are additional individuals that the user is attempting to add to his or her social network, step 506. Where there are additional individuals to add to the social network for the user, step 506, processing returns to step 502 where the user identifies a next individual as a member of the social network for the user. Where there are no additional individuals to add to the social network for the user, a check is performed to determine if additional users are attempting to add individuals to their respective social networks, step 508. Where the check at step 508 evaluates to true, processing returns to step 502 where a subsequent user identifies an individual as a member of his or her social network. Processing is complete where there are no additional users identifying individuals to add to their respective social networks, step 510.

One embodiment of a graphical user interface that may be utilized in conjunction with the method of FIG. 5 for allowing a given user to identify individuals with whom the given user maintains a relationship is illustrated at FIG. 6. The interface 600 provides various mechanisms for a user (e.g., user A) to view and modify a list of friends for purposes of defining a trust network using a social network. The current list of user A's friends is displayed in a panel occupying a given portion of the viewable display area 602. For a given friend, a list entry 604 may include a user ID, a description, and a trust weight. The description field may also be populated by the given user with any information desired, such as a real name for the friend, relationship to user A, etc. The panel 602 may be implemented to support sorting by one or more fields and may include other information about a given friend, such as the number of friends a given friend has or a timestamp (not shown) indicating when the friend was added to the list. Information for populating the panel 602 may be stored in a profile for the user for use by components of the present invention for improving searching and ranking of search results.

Other information might also be provided. For example, in some embodiments, a given entry 604 presented by the panel 602 may include an "Active" flag 605 that indicates whether the friend is to be included (smiley icon) or disregarded ("not" icon) in user A's trust network. This allows user A to disregard a friend's annotations, saved pages, tags, etc., without removing the friend from the list. For example, the same list of friends for user A may be used in another social networking context (e.g., peer-to-peer file sharing), and user A may want another user (e.g., user D) to be on her friends list in the other context but not for purposes of viewing annotations, tags, saved pages, etc. In some embodiments, user A may also be able to choose whether to include (use) or ignore (not use) annotations, tags, saved pages, etc. from a given friend's friends, and the entry 604 may show this information.

An "Edit" control 606 and a "Delete" control 608 accompany a given entry. Actuating the edit control 606 opens a dialog box (or form page) via which user A may update information regarding a given friend, as well as save or cancel the changes. Actuating the delete control 608 removes the friend from user A's list. A "View Network" control 609 may also provided. Actuating the view network control 609 launches an interactive display of user A's trust network, which may include the user's friends and friends of her friends out to a maximum degree of separation, minimum confidence coefficient, or other limiting parameter for defining the trust network. The display advantageously includes all users who would be in user A's trust network (e.g., all users whose annotations would be made visible to user A) and may also show users (e.g., user D) whom user A has blocked from her trust network.

The interface 600 also includes a panel occupying a portion of the visible display area 610 through which the user may add a new friend. The user enters the a user ID for the new friend in a text box 612, a description in a text box 614 and a trust weight in a box 616. In some embodiments, the trust weight may have a default value (e.g., 3 on a scale of 1 to 5). The user may also elect, via a check box 618, whether to include the new friend's friends in her trust network. Actuating an "Add" control 620 completes the operation, and the listing in section 602 may advantageously refreshed to include the new friend. Once defined, the list of friends for the user is stored in association with other user specific information for the user, e.g., in the user profile for the user. This information may be accessed and used to personalize or customize responses to queries, e.g., in ranking search results.

The interface also includes a panel occupying a portion of the visible display area 624 that allows the user to control settings for his or her trust network. For instance, using controls 626, which in the present embodiment are radio buttons, the user may indicate whether trust network membership should be determined based on degree of separation or confidence coefficient. In some embodiments, the user may also specify a maximum degree of separation within a range (e.g., $N_{max}$=1, 2, or 3) or a minimum confidence coefficient (e.g., $p_{min}$=0.2, 0.4, or 0.8). Controls 628, 630 and 632, which in the present embodiment are checkboxes, allow the user to specify the situations in which information obtained from his or her trust network should be displayed. For example, the user may choose to whether to have search results highlighted or ordered based on information obtained from his or her trust network (boxes 628, 630), as well as whether the browser toolbar should indicate whether a displayed page has been annotated by user in the trust network for the user (box 632).

Figure 7:
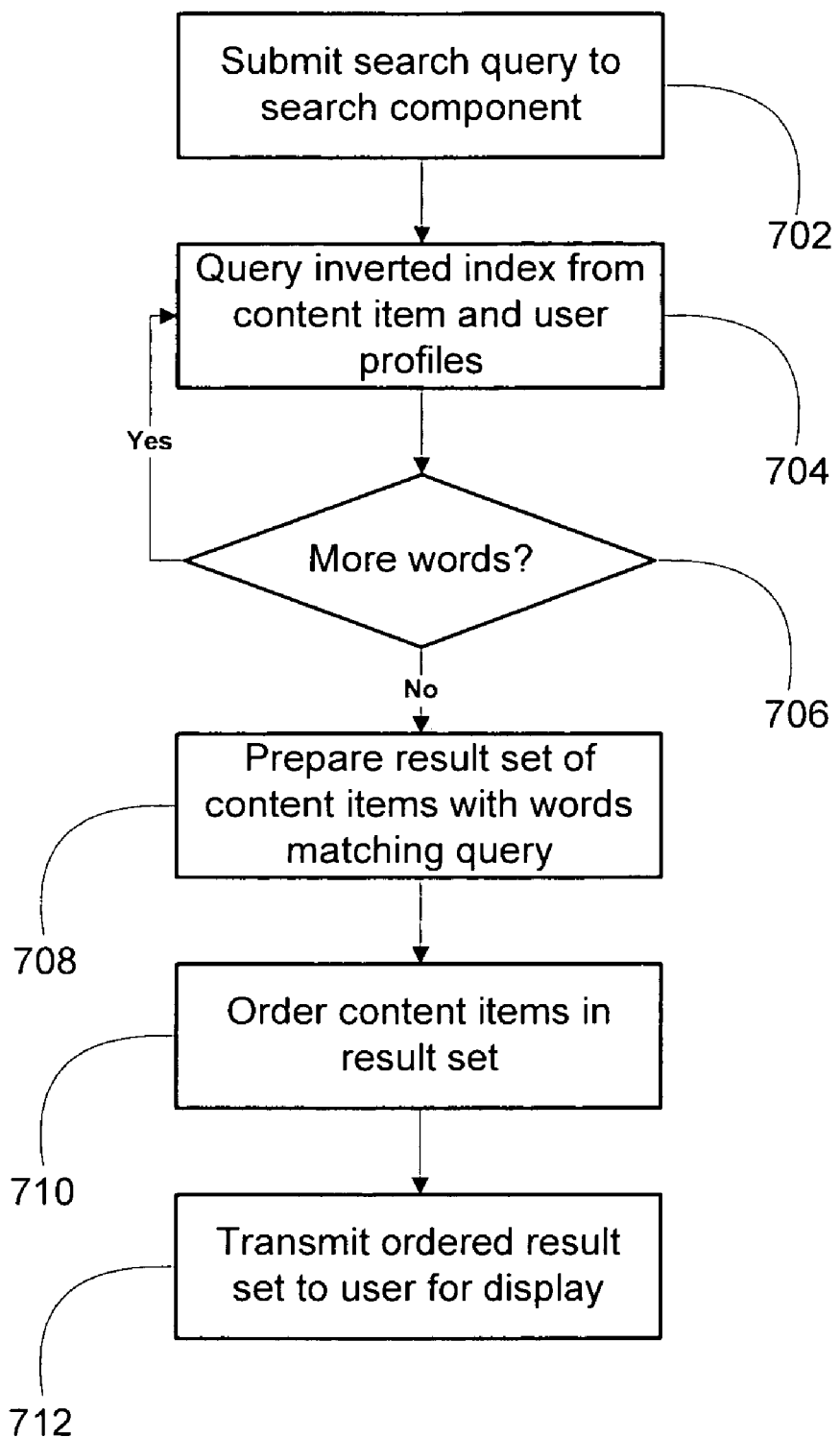
FIG. 7 is a flow diagram illustrating a method of conducting a search for a content item that employs information from user profiles according to one embodiment of the present invention.

FIG. 7 illustrates one embodiment of a method for using information contained within one or more user profiles for conducting searches for content items. According to the method of FIG. 7, a user submits a search query to a search component of a search provider, step 702. A query is conducted on the inverted index of words from the content items and personalization information, which the system may obtain from one or more user profiles, which have been indexed by the search provider, step 704. A check is also performed to determine if query comprises additional words that must be queried against the inverted index, step 706. Where additional words are present in the query, processing returns to step 704 where the additional words are queried against the inverted index to locate content items that contain the word. Where no additional words are present in the query, step 706, a result set is prepared that includes content items located in the inverted index that contain the words comprising the query or are associated with personalization information associated with the content items in the inverted index, step 708. Accordingly, the method returns content items that match the user's informational needs even though the query words do not appear in the content item, e.g., the words appear in an annotation, tag, etc. in user profile associated with the content item.

The result set is ordered or other wise ranked to generate a ranked result set identifying content items that are responsive to the query from the user, step 710. Ranking of a result set may be accomplished according to the techniques described heretofore, or other techniques known to those of skill in the art, such as a machine learned document relevance function that is operative to assign a relevance score to a given content items on the basis of a given query and whereby content items that are responsive to the given query are ordered according to a respective relevance score. The system transmits the ordered result set to the user over the network for viewing and selection of one or more content items, step 712.

Figure 8:
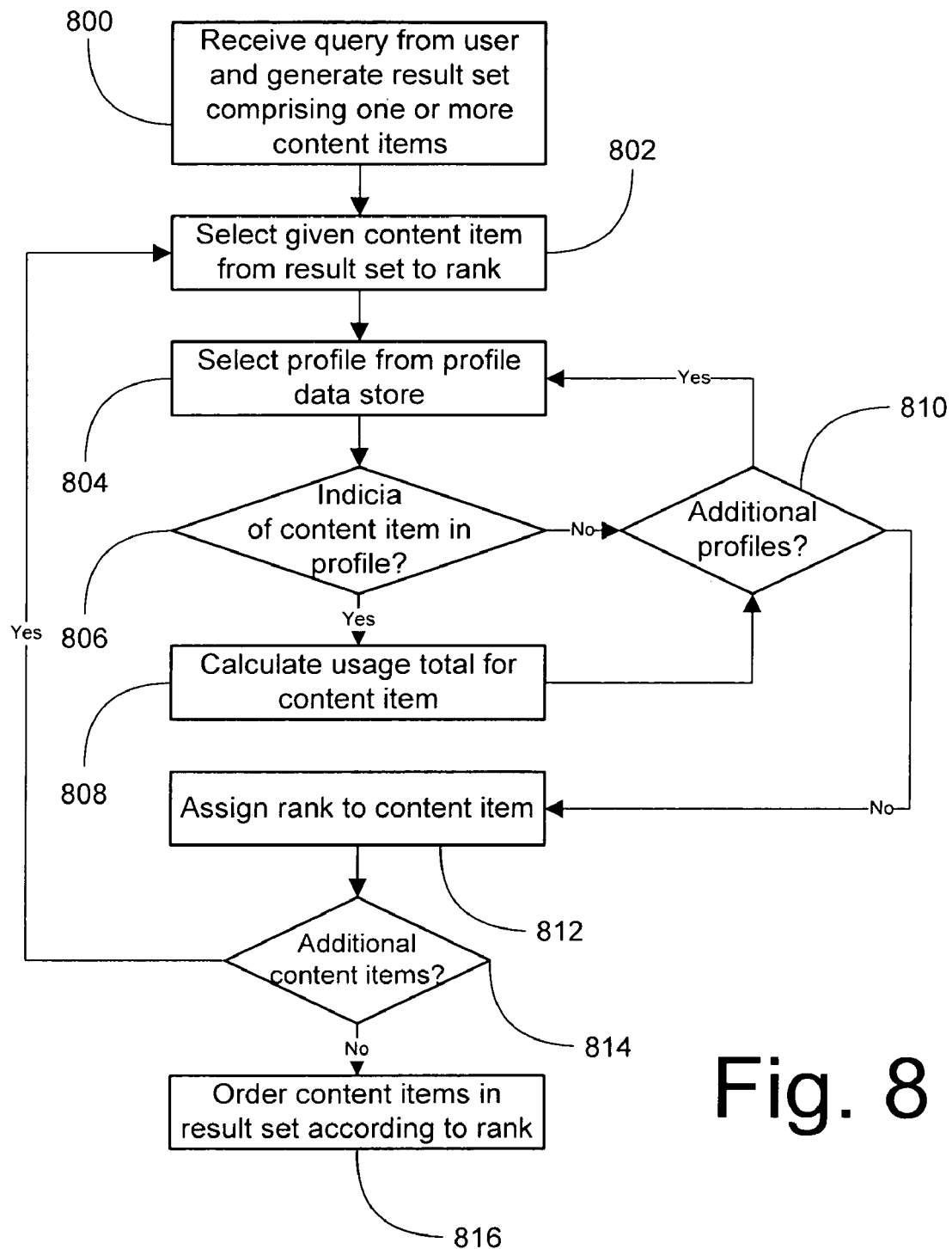
FIG. 8 is a flow diagram illustrating a method of calculating a rank for a content item that employs user profile information according to one embodiment of the present invention.

In addition to using personalized information to identify content items for inclusion in a result set, the system may utilize the personalized information to rank the content items in a result set. FIG. 8 illustrates one embodiment of a method of using personalized information in user profiles for ranking a result set. The method begins with the receipt of a query from a user and the generation result set comprising one or more content items, step 800. The system selects a given content item from the result set that requires ranking, step 802. The method traverses one or more user profiles by selecting a selected user profile from a profile data store, step 804, and a check is performed to determine if there is an indicia of the given content item in the selected profile, step 806. According to one embodiment, the one or more user profiles are user profiles for users in the social network of a user issuing the query, which may be limited to a threshold number of degrees. An exemplary indicia (or reference) contained in a user profile is an annotation for the given content item, a tag for the given content item, an indication that the user has saved the given content item, etc.

According to the present embodiment, a calculation is performed to determine a usage total for the given content item, step 808. It should be appreciated by those of skill in the art that a usage total is one calculation that may be performed using personalized information to rank one or more content items in a result set and that other calculations described above, e.g., reputation or trust, calculations based on the treatment of the content item by other individuals in the social network for a given user, etc., may be used to rank the given content item. Furthermore, indicia from disparate profiles may be weighted differently, e.g., on the basis of the number of degrees between the user issuing the query and other users in the user's social network. When a calculation is performed, step 808, or there are no indicia of the content item in the selected profile, step 806, a check is performed to determine if there are additional profiles for evaluation in ranking the given content item, step 810. Where additional profiles are present, step 810, an additional profile is selected form the profile data store, step 804, and processing continues.

After the profiles have been examined to determine if they contain indicia of the given content item content item and usage totals or other metrics have been calculated, step 808 and 810, a rank is assigned to the given content item on the basis of the usage totals or other metrics, step 812. A check is performed to determine if there are additional content items comprising the result set that require ranking, step 814. Where additional content items for ranking are present in the result set, step 814, processing returns to step 802, where another given content item is selected from the result set for ranking. When no additional content items exist in the result set that require ranking, step 814, the content items in the result set are ordered according to rank, step 816. The ordered result set may be presented to the user who executed the query that initiated the process.

As discussed above, social network information may be included in a user's profile, which may be used in searching for content items and ranking result sets. The social network information contained in the users' profiles defines explicit relationships between a given user and other individuals. It may be advantageous, however, to compute trust values between users that do not have an explicit connection in a social network, e.g., computing a trust value between two unrelated users. Because a profile for a given user according to the present invention includes information about the given user's activities, e.g., navigation history, search history, purchase history, annotations, tags, saved pages, etc., a trust value may be computed between two unrelated users on the basis of the content contained in the profiles of the two users. Put another way, if two uses share the same opinion and have common interests as expressed through their user profiles, an assumption may be made that the two users have a given degree of trust.

Figure 9:
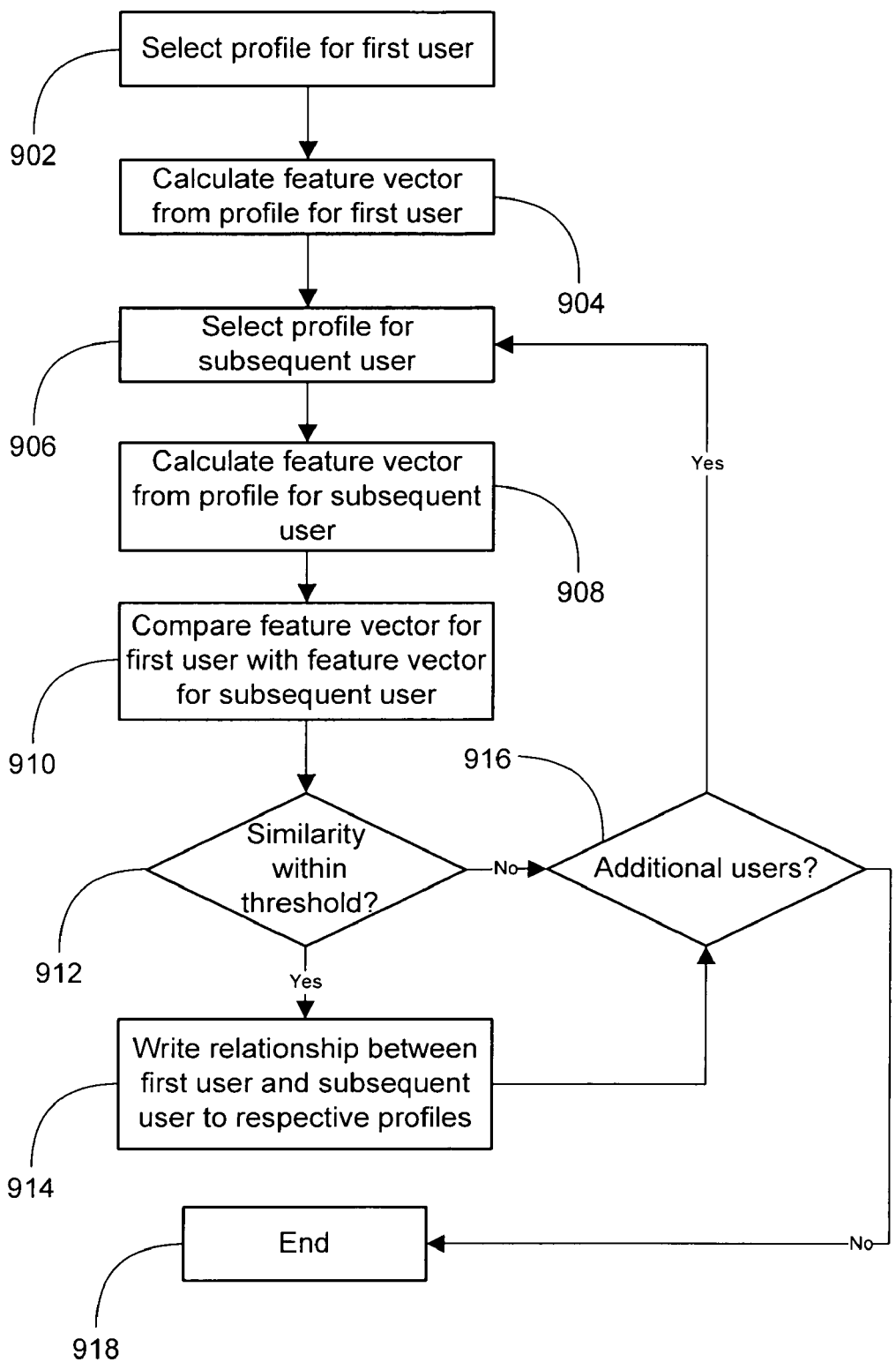
FIG. 9 is a flow diagram illustrating a method of determining an implicit social network and propagating trust through the social network according to one embodiment of the present invention.

FIG. 9 presents one embodiment of a method for propagating trust though one or more social networks of users. According to the embodiment of FIG. 9, a trust value is derived between a first user and one or more other users, which may be implicit or explicit members of a social network with the first user. The method begins with the selection of a subsequent user from the one or more other users, step 902. A feature vector is calculated for the first user based on the information contained in the profile for the first user, step 904. A profile is also selected for a subsequent user, step 906, and a feature vector is calculated for the subsequent used based on the information contained in the profile for the subsequent user, step 908.

A comparison is made between the feature vector calculated for the first user and the feature vector calculated for the subsequent user, step 910. A check is performed to determine if the similarity of the feature vector calculated for the first user and the feature vector calculated for the subsequent vector falls within a threshold, step 912. According to one embodiment, the threshold changes dynamically on the basis of the features used to calculate the feature vector, steps 904 and 908. Alternatively, the threshold may be a fixed value, e.g., five degrees, such that when the two vectors diverge in an amount that exceeds the threshold, the check performed at step 912 evaluates to false.

Where the similarity of the two vectors lies within the threshold, step 912, a relationship between the first user and the subsequent user is written to the respective profiles of the first user and the subsequent user, step 914. The relationship may simply indicate that an implicit relationship exists, that there is a level of trust between the first user and the second user based on the degree of similarity between the feature vectors of the two users (a trust value or coefficient), etc. Regardless of whether the similarity of the two feature vectors is with the threshold, step 912, a check is performed to determine if additional users exist for whom a relationship may be calculated with the first user, step 916. Where additional users exist, processing returns to step 906 where a profile for another use is selected. Where no further users exist whose feature vectors may be compared with the first user, processing for the first user is complete, step 918, and trust for the first user has been propagated over the implicit social network of users. The process may begin again at step 902 with the selection of a next first user.

Figure 10:
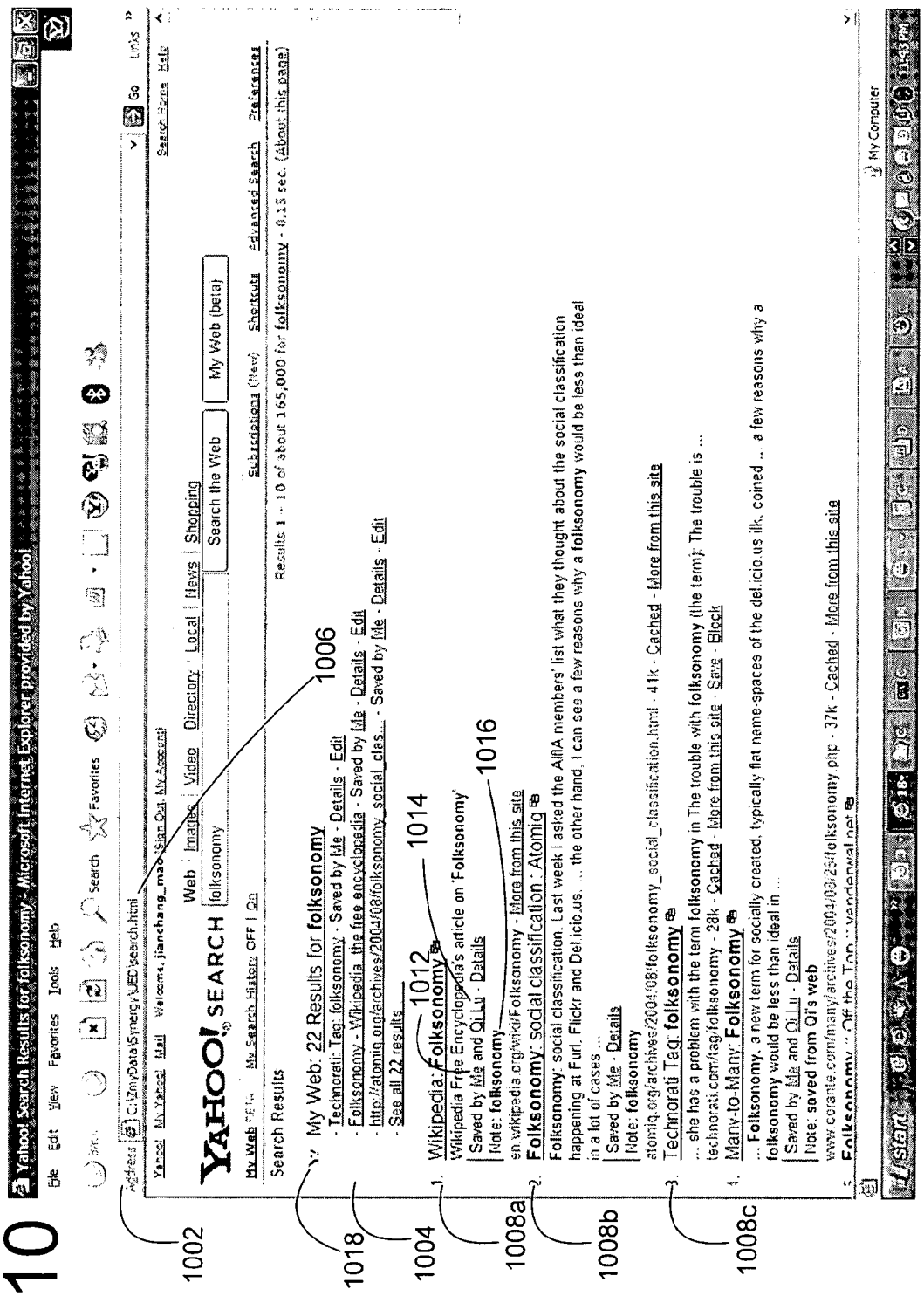
FIG. 10 is a screen diagram illustrating the ranked output of a search provider according to one embodiment of the present invention.

FIG. 10 presents a screen diagram illustrating the output of a search conducted by a user over a corpus of content items that a search provider indexes according to one embodiment of the present invention. According to the screen diagram of FIG. 10, a user, through the use of a client application 1002, in this example Microsoft's Internet Explorer web browser, has navigated to a content item 1004 located at a given address 1006. According to the present embodiment, the content item 1004 is a search results page generated by the search provider Yahoo! Search. The search results page 1004 includes both search results generated based on the corpus of content items from the web that the search provider has indexed 1008a, 1008b, 1008c, as well as results of the same search generated based on the corpus of content items that the user has saved 1018, which may be ranked differently for the corpus of content items from the web. The user is therefore supplied with search results from the web as a whole, as well as from content items that the user has saved, which have an implicit level of trust that may be higher than that for content items on the web generally. The search results also advantageously provide the user with access to information from the personal profiles of one or more users, such as an indication of those users that have saved a given content item 1012 and 1014, as well as annotations that users have associated with a given content item 1016.

Figure 11:
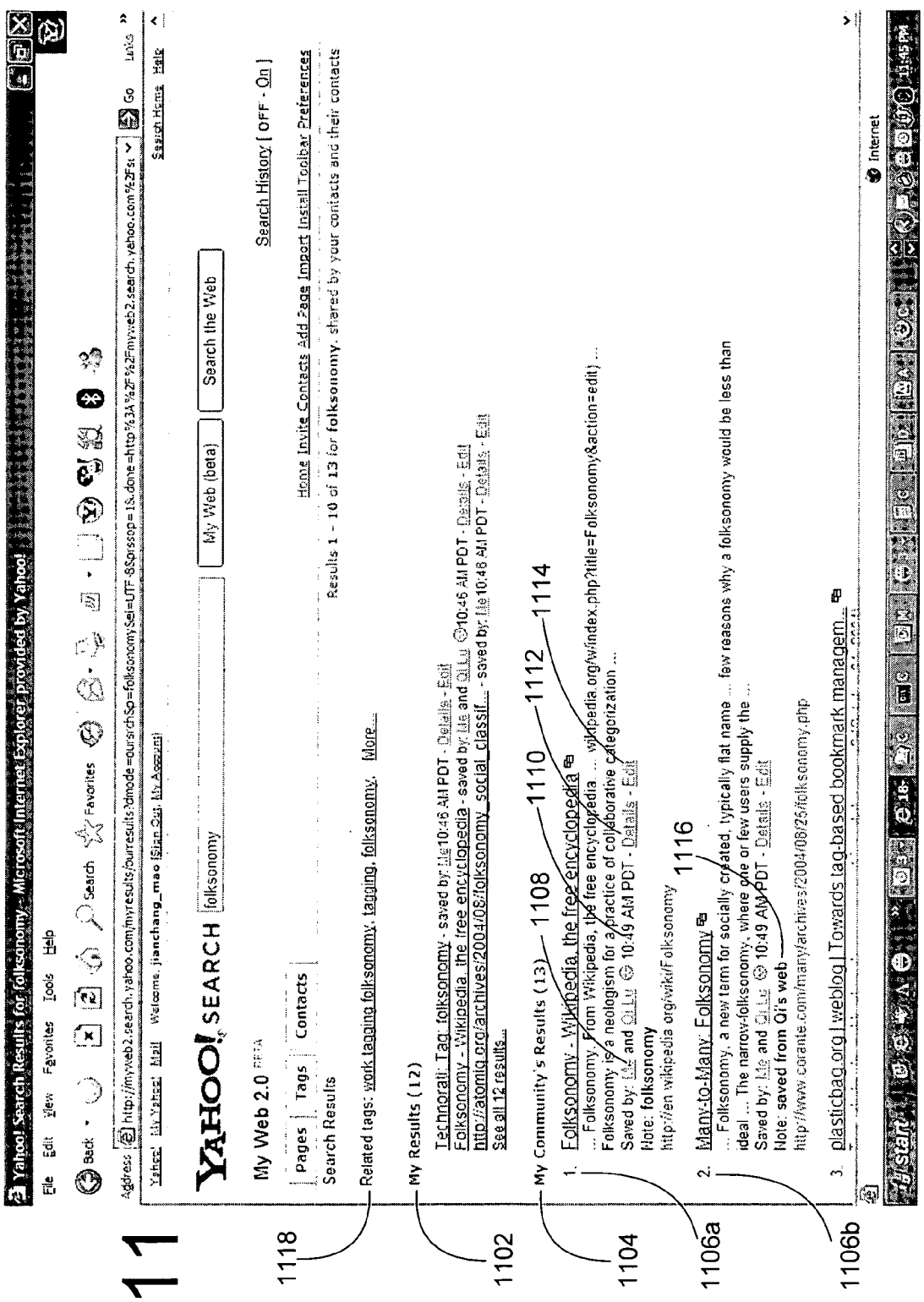
FIG. 11 is a screen diagram illustrating the ranked output of a search provider for a search for content items in a user's social network according to one embodiment of the present invention.

FIG. 11 presents a screen diagram illustrating the output of a search across the corpus of content items saved by users that are related in a social network. As with the embodiment of FIG. 10, the output of the search provider illustrated in FIG. 11 presents the user with the results of the search conducted over the corpus of content items that the user has saved 1102. In conjunction, the interface illustrates the output of the search provider with results 1104 conducted over the corpus of content items saved by individuals in the social network of the user conducting the search. The results of the search over the corpus of content items saved by individuals in the social network of the user conducting the search include one or more detailed results 1106a and 1106b. In addition to outputting a result set containing content items from the corpus of content item saved by individuals in the social network of the user conducting the search 1106a and 1106b, the interface provides additional information from the user profiles of individuals in the social network of the user conducting the search including, but not limited to, the users who have saved a given content item 1108, the time when the user saved the content item (which may alternatively include the last time the content item was saved), and annotations that users have associated with the given content item 1116. Additionally, the interface includes controls that allow the user to view additional details regarding a given content from a profile for a given user 1112, as well as edit profile information 1114.

Figure 12:
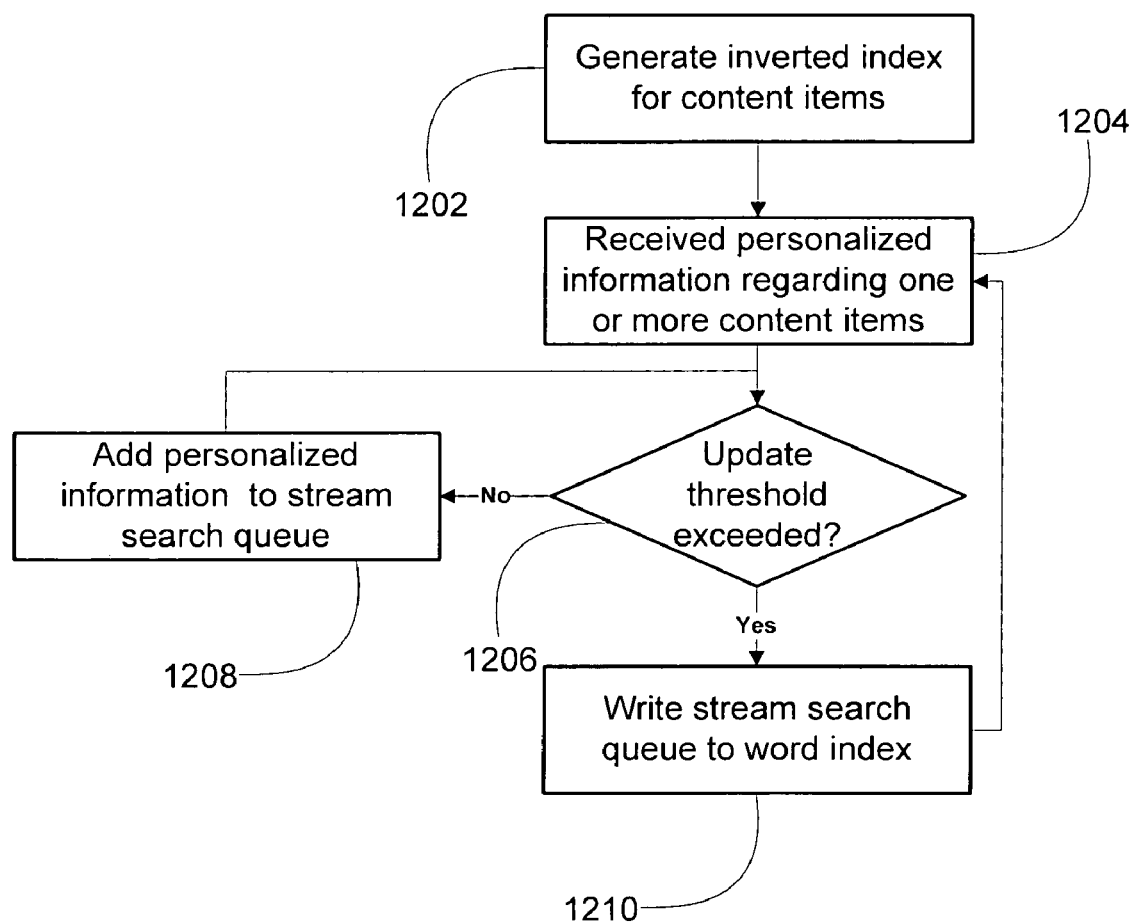
FIG. 12 is a flow diagram illustrating a method for indexing a rapidly changing collection of content items in real-time according to one embodiment of the invention.

As indicated above, embodiments of the invention provide for real-time indexing of content items and personalized information regarding the same from users. FIG. 12 is a flow diagram illustrating one embodiment of a method for indexing a rapidly changing collection of content items and personalization information in real-time. The system generates an inverted index for content items, step 1202, which as described above may comprise personalized information from one or more users. The inverted index may comprise an index of word-location pairs that is conceptually similar to book index, whereby an index of words is searched to identify entries (e.g., content items) in the index that are associated with the words.

As a user utilizes systems and methods that operate in accordance with embodiments of the present invention, the user may generate one or more items of personalized information, step 1204, such as by tagging, saving, annotating, etc. content items. As described above, the search provider received the personalized information for storage, e.g., in one or more user profiles, in the inverted index, etc. The system performs a check to determine if an update threshold is exceeded, step 1206. According to one embodiment, a software time is run and checked to determine if the elapsed time exceeds the update threshold. Alternatively, a time snapshot may be taken when an update is performed and a subsequent time snapshot taken when the check is performed to determine the elapsed time and whether the threshold is exceeded. Where the threshold is not exceeded, the system writes the received personalized information to a stream search queue, step 1208, which may be a FIFO that maintains at least a portion of the received personalized information.

Processing returns to step 1206 with the execution of a check to determine if the update threshold has been exceeded and if not, the system continues to collect and write personalized information to the stream search queue, step 1208. The stream search queue is operative to structure the information that it maintains for direct access, whereby information in the queue if examined in sequence to determine if any query terms match information that exists in the queue. Where the update threshold is exceeded, step 1206, the system writes at least a portion of the personalized information from the stream search queue to the inverted index, step 1210. According to one embodiment, personalized information that is being written to the inverted index is marked as "in progress" and removed from the stream search queue when indexing is complete. It should be noted by those of skill in the art that the system may receive additional personalized information from users when indexing personalized information in the stream search queue, which the system may write or add to the stream search queue. According to an alternative embodiment, personalized information in the search stream queue may be indexed serially as a given item of personalized information reaches the front of the queue, remaining in the queue until indexing is complete.

Figure 13:
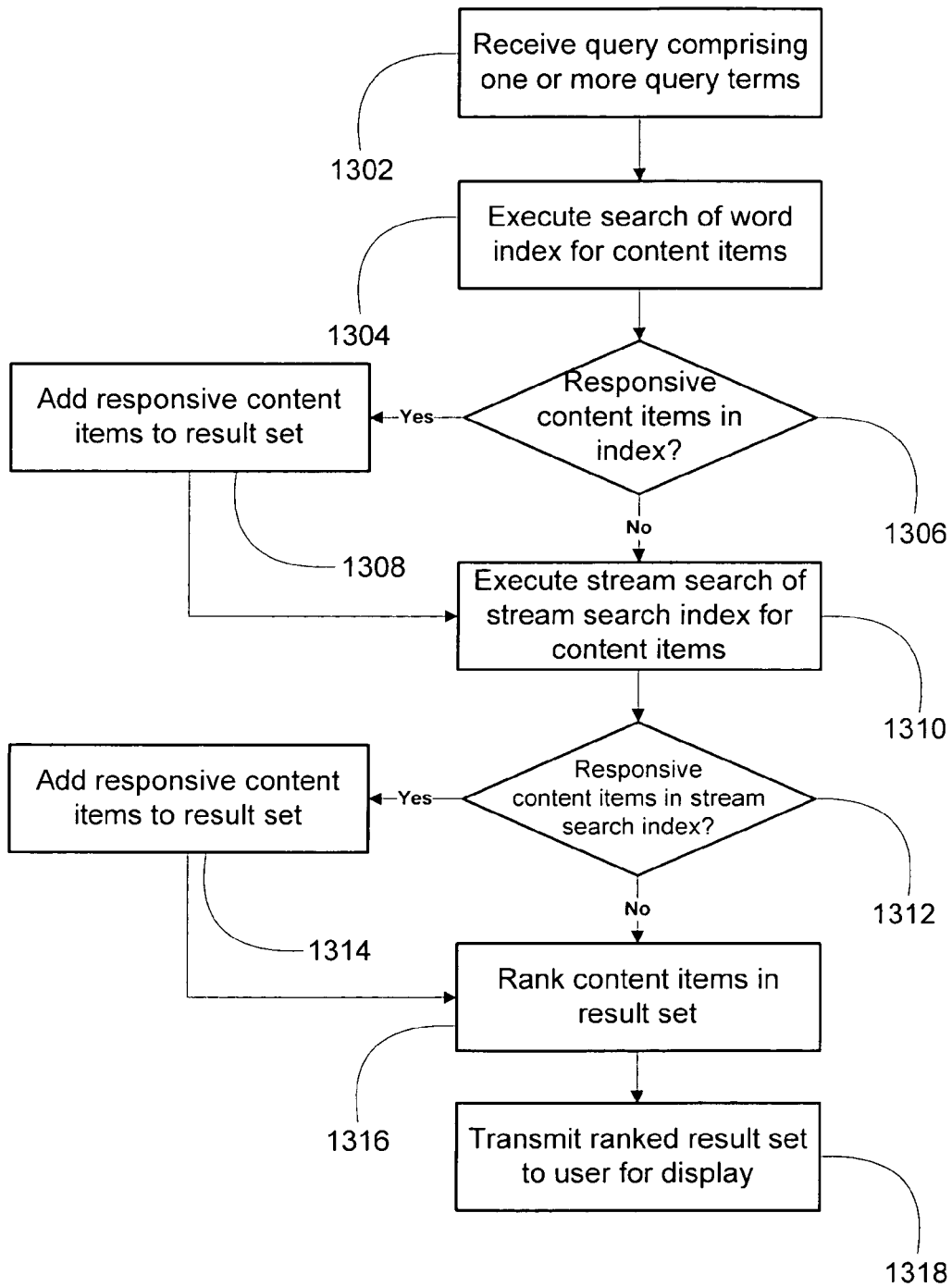
FIG. 13 is a flow diagram illustrating a method for searching a rapidly changing collection of content items that is being indexed in real-time according to one embodiment of the present invention.

One embodiment of a method for searching a rapidly changing collection of content items and personalized information that is being indexed in real-time is illustrated in the flow diagram of FIG. 13. According to the method of FIG. 13, the system receives a query comprising one or more query terms over a network from a user utilizing a client device in communication with a search provider, step 1302. The system executes a search, e.g., by a search component, of an inverted index to identify content items that are responsive to the query, step 1304. A check is performed to determine if content items exist in the inverted index that are responsive to the query from the user, step 1306. Where responsive content items exist in the inverted index, the content items are added to the result set, step 1308.

Where the check to determine responsive content items evaluates to false, step 1306, or after adding any responsive content items from the inverted index to the result set, step 1308, the system executes a stream search of the content items in the stream search queue, step 1310. According to one embodiment, the system uses the grep pattern-matching program, where the query terms are formulated or reformulated as a regular expression. Alternatively, the system may utilize other information retrieval tools known to those of skill in the art where the query is a list of keywords or a Boolean expression. A check is performed to determine if content items exist in the stream search queue that are responsive to the query from the user, step 1312. Where responsive content items exist in the stream search queue, the content items are added to the result set, step 1314.

The system ranks the result set, e.g., by a ranking component, to generate a ranked result set, step 1316. A number of techniques are known to those of skill in the art, in addition to the novel techniques described herein, that the system may utilize to rank content items in a result set. For example, a given item in the result set may be assigned a score, such as a relevance score, with the items in the result set ordered according to score. The system transmits the ranked result set over the network to the user for display on a client device that the user is utilizing, step 1318. The present embodiment offers the benefits of both inverted index search and stream search. Because a majority of content items are tracked by the inverted index, search is fast. Because stream search is available for newly received personalized information, users can add and search personalized information, including content items, in real-time without the need to wait for updates to the inverted index.

FIGS. 1 through 13 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or Other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for indexing content items, the method comprising:

generating, using a processor, an inverted index of word location pairs that identifies the location of one or more words in one or more content items available on a network;

storing the inverted index in an index data store;

dynamically receiving one or more additional content items over the network;

prior to elapsing of a predetermined time threshold, storing the one or more additional content items in a stream search queue, the stream search queue operative to allow for a stream search of the one or more additional content items;

once the time threshold elapses, indexing, using the processor, the one or more additional content items in the stream search queue and then writing the indexed content from the stream search queue into the inverted index;

receiving a query from a user, the query comprising one or more query executing a stream search of the stream search queue to identify a given one of the query terms and to generate a stream search result set;

executing an index search of the inverted index of word location pairs to identify a given one of the query terms and generate an index result set; and generating a merge result set on the basis of the stream result set and the index result set.

2. The method of claim 1 wherein generating the inverted index of word location pairs comprises indexing the location of one or more words that appear in one or more web pages.

3. The method of claim 1 comprising:
transmitting the merge result set to the user for display on a client device.

4. The method of claim 1 wherein if the time threshold has not expired, adding the one or more content items in the stream search queue.

5. The method of claim 1 comprising indexing the one or more content items from the stream search queue into the inverted index of word location pairs upon receipt of a subsequent one or more content items.

6. The method of claim 1 wherein generating the inverted index comprises indexing one or more items of personalized information.

7. The method of claim 6 comprising retrieving the personalized information from one or more user profiles.

8. The method of claim 6 comprising:
if the time threshold has expired, indexing the one or more items of personalized information into the inverted index of word location pairs.

9. The method of claim 8 wherein if the time threshold has not expired, adding the personalized information in the stream search queue.

10. The method of claim 1 comprising:
receiving one or more items of personalized information; and
serially indexing a given item of the one or more items of personalized information into the inverted index when the given item reaches the beginning of the stream search queue.

11. The method of claim 3 wherein executing the stream search and executing the index search comprises applying a scoring technique and wherein generating the merge result set comprises ordering according to the scoring technique.

12. An apparatus for indexing content items, the apparatus comprising:
a processor, in response to executable instructions from a computer readable medium, operative to:
generate an inverted index of word location pairs that identifies the location of one or more words in one or more content items available on a network;
store the inverted index in an index data store;
dynamically receive one or more additional content items over the network;
prior to elapsing of a predetermined time threshold, store the one or more additional content items in a stream search queue, the stream search queue operative to allow for a stream search of the one or more additional content items;
once the time threshold elapses, index the one or more additional content items in the stream search queue and then writing the indexed content from the stream search queue into the inverted index;
receiving a query from a user, the query comprising one or more query terms;
executing a stream search of the stream search queue to identify a given one of the query terms and to generate a stream search result set;
executing an index search of the inverted index of word location pairs to identify a given one of the query terms and generate an index result set; and
generating a merge result set on the basis of the stream result set and the index result set.

* * * * *

UNITED STATES PATENT AND TRADEMARK OFFICE
CERTIFICATE OF CORRECTION

PATENT NO. : 7,634,466 B2
APPLICATION NO. : 11/498706
DATED : December 15, 2009
INVENTOR(S) : Rose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Ninth Day of November, 2010

David J. Kappos
*Director of the United States Patent and Trademark Office*